US011366806B2

(12) United States Patent
Urbanke et al.

(10) Patent No.: US 11,366,806 B2
(45) Date of Patent: Jun. 21, 2022

(54) AUTOMATED FEATURE GENERATION FOR MACHINE LEARNING APPLICATION

(71) Applicant: The SQLNet Company GmbH, Leipzig (DE)

(72) Inventors: Patrick Axel Urbanke, Leipzig (DE); Rainer Alexander Uhlig, Leipzig (DE)

(73) Assignee: THE SQLNET COMPANY GMBH, Leipzig (DE)

( * ) Notice: Subject to any disclaimer, the term of this patent is extended or adjusted under 35 U.S.C. 154(b) by 367 days.

(21) Appl. No.: 16/531,526

(22) Filed: Aug. 5, 2019

(65) Prior Publication Data

US 2021/0042297 A1    Feb. 11, 2021

(51) Int. Cl.
| G06F 16/242 | (2019.01) |
| G06F 16/2453 | (2019.01) |
| G06N 20/00 | (2019.01) |
| G06K 9/62 | (2022.01) |

(52) U.S. Cl.
CPC ...... *G06F 16/244* (2019.01); *G06F 16/24542* (2019.01); *G06K 9/6257* (2013.01); *G06N 20/00* (2019.01)

(58) Field of Classification Search
CPC . G06F 16/244; G06F 16/24542; G06N 20/00; G06K 9/6257
USPC .......................................................... 707/737
See application file for complete search history.

(56) References Cited

U.S. PATENT DOCUMENTS

| 2017/0177309 | A1* | 6/2017 | Bar-Or ...................... G06F 8/34 |
| 2017/0193546 | A1* | 7/2017 | Bennett ................... G06N 20/00 |
| 2017/0286502 | A1* | 10/2017 | Bar-Or ................ G06F 16/2423 |
| 2018/0293723 | A1 | 10/2018 | Bae et al. |
| 2019/0384762 | A1* | 12/2019 | Hill ..................... G06F 16/9535 |
| 2020/0034749 | A1* | 1/2020 | Kumar ..................... G06F 16/93 |

OTHER PUBLICATIONS

Lam et al., "One button machine for automating feature engineering in relational databases," IBM Research, Jun. 1, 2017, 9 pages.
European Search Report for corresponding EP Application No. EP20189274 dated Feb. 12, 2021, 10 pages.

* cited by examiner

*Primary Examiner* — Evan Aspinwall
(74) *Attorney, Agent, or Firm* — Hoffman Warnick LLC

(57) ABSTRACT

Various implementations include approaches for automating feature generation. The underlying intellectual paradigm to the approach is ensemble learning. That is, each generated feature is an element in an ensemble. Ensemble learning is a very successful paradigm in classical machine learning and dominates real-world predictive analytics projects through tools such as xgboost ( ... ) or lightgbm ( ... ). It is also appropriate, because of its ease-of-use compared to other successful paradigms such as deep learning. Moreover, it is possible to generate human-readable SQL code, which is very difficult with deep learning approaches. The various implementations described herein provide for increased scalability and efficiency as compared with conventional approaches.

19 Claims, 25 Drawing Sheets

```
SELECT aggregation( value_to_be_aggregated )
FROM population_table t1
LEFT JOIN peripheral_table t2
ON t1.join_key = t2.join_key
AND t2.time_stamp <= t1.time_stamp
WHERE (
(condition_1 = true AND condition_1.2 = true)
OR (condition_1 = false AND condition_1.1 = false)
)
GROUP BY t1.join_key , t1.time_stamp;
```

FIG. 4

```
def update_incrementally(condition_tree, threshold, matches):
    changing_matches = identify_changing_matches(
        threshold, matches)
    change_activation_status(changing_matches)
    incrementally_update_aggregations(
        changing_matches)
    incrementally_update_optimization_criterion(
        changing_matches)
```

FIG. 5

```
def train(condition_tree, matches):

if condition_tree is empty:
        activate_all(matches)

splits = []

for thr in bin_function(matches):
        target_value = update_incrementally(
            condition_tree,
            thr,
            matches)
        splits.append((target_value, thr))

best_split = find_best_split(splits)

if satisfies_stopping_criterion(
        best_split, condition_tree):
        return condition_tree update_incrementally(
        conditions,
        best_split.thr,
        matches)

condition_tree = update_condition_tree(
        condition_tree, best_split.thr)

activated_matches = [
        m for m in matches if m is activated]

deactivated_matches = [
        m for m in matches if m is deactivated]

condition_tree = train(
        activated_matches, condition_tree)

condition_tree = train(
        deactivated_matches, condition_tree)

return conditions
```

FIG. 6

```
def find_next_smaller(m):
    s = m
    --s while !s.activated:
        --s return s def find_next_greater(m):
    g = m
    ++g while !s.activated:
        ++g return g
```

FIG. 7

```
def activate_match(p):
    unique_indices.insert(ix_output(p))
    values[ix_output(p)] += 1 def deactivate_match(p):
    unique_indices.insert(ix_output(p))
    values[ix_output(p)] -= 1
```

FIG. 8

```
def activate_match(p):
        unique_indices.insert(ix_output(p))
        values[ix_output(p)] += get_value(p)

def deactivate_match(p):
        unique_indices.insert(ix_output(p))
        values[ix_output(p)] -= get_value(p)
```

FIG. 9

```
def activate_match(p):
    unique_indices.insert(ix_output(p))
    counts[ix_output(p)] += 1
    sums[ix_output(p)] += get_value(p)
    values[ix_output(p)] = sums[ix_output(p)] \
        /counts[ix_output(p)]

def deactivate_match(p):
    unique_indices.insert(ix_output(p))
    counts[ix_output(p)] -= 1
    sums[ix_output(p)] -= get_value(p)
    if counts[ix_output(p)] == 0:
        values[ix_output(p)] = NULL
    else:
        values[ix_output(p)] = sums[ix_output(p)] \
            /counts[ix_output(p)]
```

FIG. 10

```
def activate_match(p):
    unique_indices.insert(ix_output(p))

counts[ix_output(p)] += 1
    sums[ix_output(p)] += get_value(p)
    sums_squared[ix_output(p)] += get_value(p)^2 mean = sums[ix_output(p)] \\
           /counts[ix_output(p)]

values[ix_output(p)] = sums_squared[ix_output(p)] \\
           /counts[ix_output(p)] - mean^2 def deactivate_match(p):
    unique_indices.insert(ix_output(p))

counts[ix_output(p)] -= 1
    sums[ix_output(p)] -= get_value(p)
    sums_squared[ix_output(p)] -= get_value(p)^2 mean = sums[ix_output(p)] \\
           /counts[ix_output(p)]

if counts[ix_output(p)] == 0:
        values[ix_output(p)] = NULL
    else:
        values[ix_output(p)] = sums_squared[ix_output(p)] \\
               /counts[ix_output(p)] - mean^2
```

FIG. 11

```
def activate_match(p):
    unique_indices.insert(ix_output(p))

counts[ix_output(p)] += 1
    sums[ix_output(p)] += get_value(p)
    sums_squared[ix_output(p)] += get_value(p)^2 mean = sums[ix_output(p)] \\
        / counts[ix_output(p)]

values[ix_output(p)] = sqrt( \\
        sums_squared[ix_output(p)] \\
        / counts[ix_output(p)] - mean^2)

def deactivate_match(p):
    unique_indices.insert(ix_output(p))

counts[ix_output(p)] -= 1
    sums[ix_output(p)] -= get_value(p)
    sums_squared[ix_output(p)] -= get_value(p)^2 mean = sums[ix_output(p)] \\
        / counts[ix_output(p)]

if counts[ix_output(p)] == 0:
        values[ix_output(p)] = NULL
    else:
        values[ix_output(p)] = sqrt( \\
            sums_squared[ix_output(p)] \\
            / counts[ix_output(p)] - mean^2)
```

FIG. 12

```
def activate_match(p):
    unique_indices.insert(ix_output(p))

counts[ix_output(p)] += 1
    sums[ix_output(p)] += get_value(p)
    sums_squared[ix_output(p)] += get_value(p)^2
    sums_cubed[ix_output(p)] += get_value(p)^3 mean = sums[ix_output(p)] \\
        /counts[ix_output(p)]
    stddev = sqrt( \\
        sums_squared[ix_output(p)] \\
        /counts[ix_output(p)] - mean^2)

values[ix_output(p)] = (\\
        sums_cubed[ix_output(p)]/counts[ix_output(p)]\\
        - 3*mean*stddev^2 - mean^3
    ) / ( stddev^3 )

def deactivate_match(p):
    unique_indices.insert(ix_output(p))

counts[ix_output(p)] -= 1
    sums[ix_output(p)] -= get_value(p)
    sums_squared[ix_output(p)] -= get_value(p)^2
    sums_cubed[ix_output(p)] -= get_value(p)^3 mean = sums[ix_output(p)] \\
        /counts[ix_output(p)]
    stddev = sqrt( \\
        sums_squared[ix_output(p)] \\
        /counts[ix_output(p)] - mean^2)

if counts[ix_output(p)] == 0:
        values[ix_output(p)] = NULL
    else:
        values[ix_output(p)] = (\\
            sums_cubed[ix_output(p)]/counts[ix_output(p)]\\
            - 3*mean*stddev^2 - mean^3
        ) / ( stddev^3 )
```

FIG. 13

```
def activate_match(p):
    unique_indices.insert(ix_output(p))

counts[ix_output(p)] += 1 get_match(p).activated = true if counts[ix_output(p)] == 1 \\
        or get_match(p) > current_matches[ix_output(p)]:
            current_matches[ix_output(p)] = get_match(p)
            values[ix_output(p)] = get_value(get_match(p))

def deactivate_match(p):
    unique_indices.insert(ix_output(p))

counts[ix_output(p)] -= 1 get_match(p).activated = false if counts[ix_output(p)] == 0:
        current_matches[ix_output(p)] = NULL
        values[ix_output(p)] = NULL
        return if get_match(p) == current_matches[ix_output(p)]:
        m = find_next_smaller(get_match(p))
        current_matches[ix_output(p)] = m
        values[ix_output(p)] = get_value(m)
```

FIG. 14

```
def activate_match(p):
    unique_indices.insert(ix_output(p))

counts[ix_output(p)] += 1 get_match(p).activated = true if count == 1 or get_match(p) < current_matches[ix_output(p)]:
        current_matches[ix_output(p)] = get_match(p)
        values[ix_output(p)] = get_value(get_match(p))

def deactivate_match(p):
    unique_indices.insert(ix_output(p))

counts[ix_output(p)] -= 1 get_match(p).activated = false if count == 0:
        current_matches[ix_output(p)] = NULL
        values[ix_output(p)] = NULL
        return if get_match(p) == current_matches[ix_output(p)]:
        m = find_next_greater(get_match(p))
        current_matches[ix_output(p)] = m
        values[ix_output(p)] = get_value(m)
```

FIG. 15

```
def activate_match(p):
    unique_indices.insert(ix_output(p))

counts[ix_output(p)] += 1 get_match(p).activated = true if counts[ix_output(p)] == 1:
        current_matches[ix_output(p)] = get_match(p)
        values[ix_output(p)] = get_value(get_match(p))
        return if counts[ix_output(p)] % 2 == 0:

g = current_matches[ix_output(p)]
        s = g if get_match(p) > g:
            g = find_next_greater(g)
            current_matches[ix_output(p)] = g else:
            s = find_next_smaller(s)

values[ix_output(p)] = ( \\
            get_value(s) + get_value(g)) / 2 else:

g = current_matches[ix_output(p)]

if get_match(p) < g:
            g = find_next_smaller(g)
            current_matches[ix_output(p)] = g values[ix_output(p)] = get_value(g)
```

FIG. 16

```
def deactivate_match(p):
    unique_indices.insert(ix_output(p))

counts[ix_output(p)] -= 1 get_match(p).activated = false if counts[ix_output(p)] == 0:
        current_matches[ix_output(p)] = NULL
        values[ix_output(p)] = NULL
        return if counts[ix_output(p)] % 2 == 0:

g = current_matches[ix_output(p)]
        s = g if get_match(p) < g:
            g = find_next_greater(g)
            current_matches[ix_output(p)] = g else if get_match(p) > g:
            s = find_next_smaller(s)

else:
            g = find_next_greater(g)
            s = find_next_smaller(s)
            current_matches[ix_output(p)] = g values[ix_output(p)] = ( \\
            get_value(s) + get_value(g)) / 2 else:

g = current_matches[ix_output(p)]

if get_match(p) >= g:
            g = find_next_smaller(g)
            current_matches[ix_output(p)] = g values[ix_output(p)] = get_value(g)
```

FIG. 17

```
def activate_match(p):
    unique_indices.insert(ix_output(p))

get_match(p).activated = true val = get_value(p)

m = get_match(p)
    --m while m >= matches[0]:
        if get_value(m) != val:
            break if ix_output(m) != ix_output(p):
            break if m.activated:
            return --m m = get_match(p)
    ++m while m <= matches[length(matches)-1]:
        if get_value(m) != val:
            break if ix_output(m) != ix_output(p):
            break if m.activated:
            return ++m values[ix_output(p)] += 1
```

FIG. 18

```
def deactivate_match(p):
    unique_indices.insert(ix_output(p))

get_match(p).activated = false val = get_value(get_match(p))

m = get_match(p)
    --m while m >= matches[0]:

if get_value(m) != val:
            break if ix_output(m) != ix_output(p):
            break if m.activated:
            return --m m = get_match(p)
    ++m while m <= matches[length(matches)-1]:

if get_value(m) != val:
            break if ix_output(m) != ix_output(p):
            break if m.activated:
            return ++m values[ix_output(p)] -= 1
```

FIG. 19

```
def update(ix_output, old_value, new_value):
    values[ix_output] += new_value - new_value
```

- The above pseudo code shows an algorithm for updating SUM as an intermediate aggregation We can update the AVG aggregation using a similar approach:

```
def update(ix_output, old_value, new_value):
    values[ix_output] += (new_value - new_value) \\
                        /counts[ix_output]
```

FIG. 20

```
SELECT w_0 + AGGREGATION(
        CASE WHEN condition_1 THEN w_1
             WHEN condition_2 THEN w_2
        END )
FROM population_table t1
LEFT JOIN peripheral_table t2
ON t1.join_key = t2.join_key
AND t2.time_stamp <= t1.time_stamp
GROUP BY t1.join_key, t1.time_stamp;
```

244: Calculate an updated value of the optimization criterion R-squared by:

using a formula for the optimization criterion R-squared which is based on feature values $\nabla f_{t,i}$ determined before the condition was varied in process 241, which includes expressions for adding contributions of the updated feature values $\nabla f_{t,i}^{new}$ determined in process 243, and which includes expressions for subtracting contributions of old feature values $\nabla f_{t,i}^{old}$ that are to be replaced by the updated feature values $\nabla f_{t,i}^{new}$ determined in process 243;

the formula may be defined by:

$$\text{updated R-squared} = \frac{(I * S_{xy}^{new} - S_x^{new} * (\sum_i \epsilon_i))^2}{(S_{xx}^{new} - S_x^{new 2}) * (\sum_i \epsilon_i^2 - (\sum_i \epsilon_i)^2)}$$

wherein:

$$S_{xy} := \sum_i \nabla f_{t,i} \epsilon_i, \quad S_x := \sum_i \nabla f_{t,i}, \quad S_{xx} := \sum_i \nabla f^2_{t,i}$$

$$S_{xy}^{new} = S_{xy}^{old} + (\nabla f_{t,i}^{new} - \nabla f_{t,i}^{old})\epsilon_i$$
$$S_x^{new} = S_x^{old} + \nabla f_{t,i}^{new} - \nabla f_{t,i}^{old}$$
$$S_{xx}^{new} = S_{xx}^{old} + \nabla f_{t,i}^{new}\nabla f_{t,i}^{new} - \nabla f_{t,i}^{old}\nabla f_{t,i}^{old}$$

AUTOMATED FEATURE GENERATION FOR MACHINE LEARNING APPLICATION

BACKGROUND

Technical Field

The present disclosure relates to machine learning. More specifically, the present disclosure relates to processes for generating features for machine learning applications in an efficient, effective manner

Related Art

Feature engineering takes up a major portion of the time in real-world data science projects. Moreover, expert time is by far the most expensive resource in such projects. In order to understand the importance of the problem, consider the following example: A data scientist working for a bank wants to predict which bank customers will close their account. The data scientist is given several tables: one of them contains a list of all accounts, when they were opened and when they were closed, if at all. Another table contains a list of all transactions by a certain account.

The data scientist is likely to begin by developing hypotheses: for instance, that an account that has conducted many transactions in the last 90 days is less likely to be closed than those accounts with fewer transactions in that period. However, this is only one feature. If the data scientist wants to develop a successful predictive model, he must develop hundreds of features like this one. He will spend most of his time developing hypotheses and hand-crafting features. That leaves little time to test and develop the predictive model, making the process untenable in many circumstances.

SUMMARY

All examples and features mentioned below can be combined in any technically possible way.

Various implementations include approaches for automating feature generation. The underlying intellectual paradigm to the approach is ensemble learning. That is, each generated feature is an element in an ensemble. Ensemble learning is a very successful paradigm in classical machine learning and dominates real-world predictive analytics projects through tools such as xgboost ( . . . ) or lightgbm ( . . . ). It is also appropriate, because of its ease-of-use compared to other successful paradigms such as deep learning. Moreover, it is possible to generate human-readable SQL code, which is very difficult with deep learning approaches. The various implementations described herein provide for increased scalability and efficiency as compared with conventional approaches.

Some particular aspects include a computer-implemented method of generating a feature for a machine-learning application, the method including: a) identifying a preliminary feature comprising at least one aggregation function that aggregates relational sample data or learnable weights applied to the sample data; b) calculating aggregation results with the aggregation function; c) determining, based upon an optimization criterion formula, a quality with which the aggregation results relate to target values; d) adjusting the preliminary feature by incrementally changing a condition applied to the aggregation function; e) calculating aggregation results of the adjusted preliminary feature by adjusting the aggregation results from a previous preliminary feature; f) determining a quality with which the aggregation results of the adjusted preliminary feature relate to the target values; and g) repeating processes (d) through (f) for a plurality of incremental changes, and selecting a feature that yields the best quality.

In additional particular aspects, a system includes: a computing device having a processor and a memory, the computing device configured to generate a feature for a machine-learning application by performing processes including: a) identifying a preliminary feature comprising at least one aggregation function that aggregates relational sample data or learnable weights applied to the sample data; b) calculating aggregation results with the aggregation function; c) determining, based upon an optimization criterion formula, a quality with which the aggregation results relate to target values; d) adjusting the preliminary feature by incrementally changing a condition applied to the aggregation function; e) calculating aggregation results of the adjusted preliminary feature by adjusting the aggregation results from a previous preliminary feature; f) determining a quality with which the aggregation results of the adjusted preliminary feature relate to the target values; and g) repeating processes (d) through (f) for a plurality of incremental changes, and selecting a feature that yields the best quality.

Other particular aspects include a computer program product stored on a non-transitory computer readable medium, which when executed by a computing device, causes the computing device to generate a feature for a machine-learning application by performing processes including: a) identifying a preliminary feature comprising at least one aggregation function that aggregates relational sample data or learnable weights applied to the sample data; b) calculating aggregation results with the aggregation function; c) determining, based upon an optimization criterion formula, a quality with which the aggregation results relate to target values; d) adjusting the preliminary feature by incrementally changing a condition applied to the aggregation function; e) calculating aggregation results of the adjusted preliminary feature by adjusting the aggregation results from a previous preliminary feature; f) determining a quality with which the aggregation results of the adjusted preliminary feature relate to the target values; and g) repeating processes (d) through (f) for a plurality of incremental changes, and selecting a feature that yields the best quality.

Still further aspects include a computer-implemented machine-learning method comprising: using one or more features determined and selected with the computer-implemented method of generating a feature for a machine-learning application, to calculate aggregation results from sample data that is at least partially included in one or more peripheral tables, joining the calculated aggregation results to a population table which includes target values; and training a machine-learning algorithm based on the aggregation results and the target values in the population table.

Implementations may include one of the following features, or any combination thereof.

In certain cases, the condition affects which sample data is to be aggregated with the aggregation function.

In particular aspects, process (g) includes repeating processes (d) through (f) at least twenty times, and each time changing the applied condition such that the aggregation function aggregates a larger share of the sample data or each time a smaller share of the sample data.

In some implementations, the condition splits the sample data into different groups associated with different learnable weights.

In some cases, each group of sample data has one weight.

In certain aspects, instead of aggregating the values of sample data within one group, their respective weight is aggregated.

In particular cases, process (e) includes: incrementally adjusting the aggregation results from the previous preliminary feature.

In certain aspects, the method further includes: (h) outputting the adjusted feature that yields the best quality for use in the machine-learning application.

In some cases, the method further includes incrementally repeating processes (a) through (g) for a plurality of additional conditions, wherein the adjusted feature becomes the preliminary feature during the repeating.

In particular aspects, calculating the result of the changed aggregation function includes using only a difference between the result from a current aggregation function and the result from a previous aggregation function.

In certain cases, outputting the adjusted feature is performed for only one of the adjusted features that has the best quality.

In some implementations, quality is defined by the optimization criterion formula.

In particular cases, the optimization criterion formula defines quality by maximizing (e.g., R-squared) or minimizing (e.g., squared loss, log loss).

In particular aspects, each feature is attributed to a single aggregation function.

In certain implementations, the method further includes: performing processes (a) through (g) using a distinct preliminary feature; calculating a pseudo-residual for the adjusted feature; and training the distinct preliminary feature to predict an error from the adjusted feature.

In some cases, the method further includes identifying which part of the sample data is affected by the presently applied incremental change of the condition, with the help of a match change identification algorithm, wherein process (e) of calculating the aggregation results of the adjusted preliminary feature comprises: adjusting the aggregation result from the previous preliminary feature by calculating how the sample data identified by the match change identification algorithm changes the aggregation results from the previous preliminary feature.

In particular implementations, the condition defines a threshold for sample data, and only sample data on a specific side of the threshold is to be aggregated with the aggregation function, or the condition defines a threshold for additional data associated with the sample data, and only sample data for which the associated additional data is on a specific side of the threshold is to be aggregated with the aggregation function, or the condition defines a categorical value and only sample data to which the categorical value of the condition is attributed is to be aggregated with the aggregation function.

In some cases, the method further includes: after selecting the feature that yields the best quality in process (g): (h) adding a further condition to the aggregation function and repeating processes (d) through (g) to determine the feature with the further condition that yields the best quality; and repeating process (h) to add still further conditions until a stop algorithm determines that no more conditions are to be applied to the aggregation function.

In certain implementations, the method further includes: using an optimization criterion update formula that describes how a change in the aggregation result of the aggregation function changes a previously calculated quality calculated with the optimization criterion formula, wherein process (f) of determining the quality for adjusted preliminary features comprises: determining with the optimization criterion update formula how the change in the aggregation result affects the quality, without using the optimization criterion formula for calculating the quality for adjusted preliminary features.

In some aspects, the relational sample data comprises sample data sets in one or more peripheral tables, wherein the target values are included in a population table, wherein calculated aggregation results are inserted into the population table, wherein the optimization criterion formula uses values from the population table but not from any peripheral table.

In particular cases, the preliminary feature comprises at least a first and second aggregation functions, the second aggregation function calculates an aggregation result from aggregation results of the first aggregation function, and one or more conditions are applied to at least one of the aggregation functions and processes (d) to (g) are carried out with respect to the one or more conditions.

Some implementations use one or more features that have been determined and selected to calculate aggregation results from sample data that is at least partially included in one or more peripheral tables. The calculated aggregation results are then joined to a population table which includes target values. A machine-learning algorithm is now trained based on the aggregation results and the target values in the population table.

In some aspects, the method further includes: calculating learnable weights to be aggregated by the aggregation function.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

FIGS. 4-21 illustrate example pseudocode for use in feature identification according to various embodiments of the disclosure.

FIGS. 22-25 are flow diagrams illustrating processes in an approach for generating features for machine learning applications according to embodiments of the disclosure.

Figure 1:
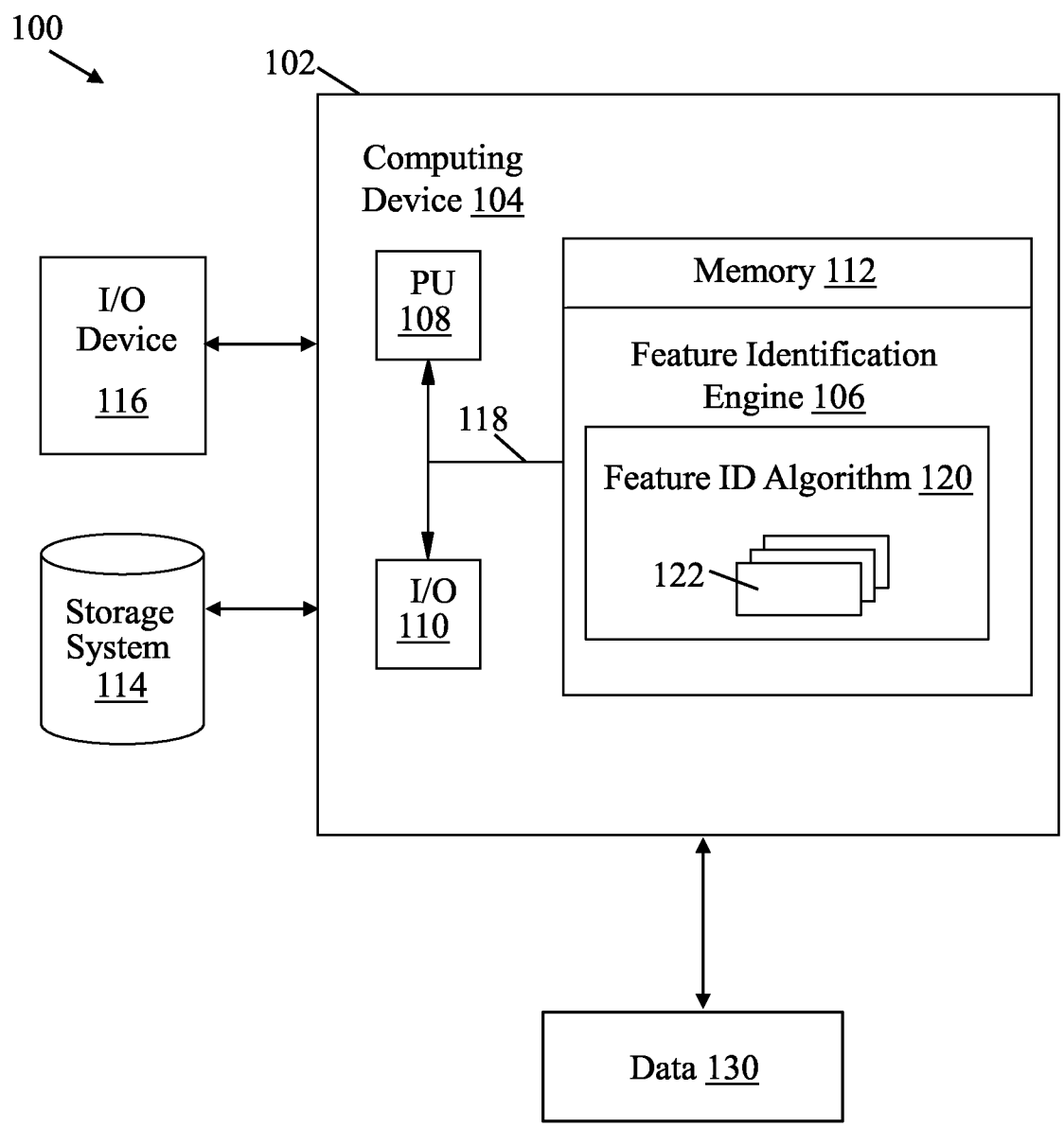
FIG. 1 depicts an illustrative environment including a computer system with a feature identification engine according to embodiments of the disclosure.

It is noted that the drawings of the disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Relational sample data sets usually require that an aggregation function, such as a SUM or AVERAGE function, calculates one feature value per sample data set. When sample data sets are used for training, a target value for each feature value may be given. The feature values are then used in machine learning applications to make predictions that should be close to the target values. The resulting quality is strongly affected by the choice of how to aggregate a sample data set. Conditions may be applied to change how sample data is aggregated. For each condition, a respective quality can be calculated. However, testing a large number of different conditions, e.g., thousands of conditions, consumes much computation power. The present disclosure tackles this problem by using incremental changes in the conditions and then calculate effects of the incremental changes instead of redoing all calculations for each condition change independently. A small incremental change of a condition typically affects only a very small share of the sample data. Therefore aggregation results and/or a quality for a changed condition can be calculated by using previous calculation results (which were calculated for another condition) and just adjusting these results for the impact of the small share of sample data affected by the present incremental change of the condition. This allows to test a huge number of different conditions and find the condition the yields the best quality for predicting target values. Conventional ways of testing conditions put high calculation power demands that strongly restricted the number of conditions that could be analyzed. Hence, data analysts conventionally spent much time to select conditions whereas the approach presented here allows to automatically find optimal conditions. To achieve this, it is a main concept of this disclosure to change a condition in small incremental steps and calculate which effects this incremental change has.

As noted herein, current approaches of generating features for machine learning applications are time consuming and ineffective. For example, conventional forecasting requires that a data analyst (or, "data scientist") painstakingly scrutinize historical data to identify features that impact forecasting. These features are the result of querying database systems in which all interrelated data is pooled (e.g., so-called relational database systems). Then, the data scientist develops a forecasting system, using these features to train machine learning algorithms to make the predictions. For example, if a bank wants to find out how many of its customers want to move to another bank in the coming quarter, the target size is the likelihood that a customer will migrate. One possible feature would be the number of banking transactions a customer has made in the past X number of days (e.g., 90 days). As a rule, hundreds of significantly more complex features are needed to develop a meaningful and accurate forecasting system; they are the basis on which the forecasting system can learn to make predictions.

The quality of the features and their selection thus determines the quality of the forecasting system; however, often the data scientist does not have time to identify all of the features that are important in predicting the target size. The algorithm then has too few, or insufficiently descriptive features available, resulting in poor predictive quality. Conventionally, the only way to address this issue is for the data scientist, in close consultation with domain experts (e.g., a customer manager(s)), to track down vulnerabilities in the forecasting system over many hours, correct overvalued traits, identify previously overlooked traits, and judge their impact on target size. This process can be extremely time-consuming and nerve-wracking, and misuse valuable intellectual resources.

In the case of non-relational data structures, algorithms that require very little problem-specific expertise on the part of the data scientist to develop forecasting systems currently exist. For example, neural networks form their own class of algorithms, which are able to independently find feature cascades in pictures, texts and time series, and derive forecasts from those inputs. Neural networks are sufficient at analyzing non-relational data structures if they are presented with many different input examples, e.g., example images of a face to learn to recognize faces in yet unknown images. These non-relational scenarios do not require that the data scientist explain to the algorithm what the features of a face look like, because in this example, program queries can check an image to determine whether the eyes, mouth, nose, etc. can be identified in a specific image detail.

In contrast to conventional approaches, various aspects of the disclosure include approaches for efficiently generating a feature for at least one condition in a machine-learning application, as well as aggregating learnable weights. These aspects of the disclosure include a feature identification engine including a statistical algorithm that almost completely automates the development of artificially intelligent systems in terms of relational data structures. Using the feature identification engine, the data scientist no longer has to extract features in painstaking and error-prone work, but merely gives the software an indication of which objective the algorithm should anticipate (e.g., customer migration or demand for goods or services), and where and in what form the raw data is stored. With this foundation, the feature identification engine automatically finds the most desirable (e.g., optimal) features. In the customer retention example described above, this feature identification system can be configured to independently determine whether the number of transactions in the last 90 days or, for example, in the last 95.5 days is the better feature for determining the probability that customers terminate their contracts.

Introduction and General Definitions

Embodiments of the disclosure can use techniques for generating a feature for one or more conditions in a machine-learning application. Embodiments of the disclosure include systems, computer program products and methods employing a feature generation engine.

To better illustrate the various embodiments of the present disclosure, particular terminology which may be known or unknown to those of ordinary skill in the art is defined to further clarify the embodiments set forth herein. The term "system" can refer to a computer system, server, etc., composed wholly or partially of hardware and/or software components, one or more instances of a system embodied in software and accessible to a local or remote user, all or part of one or more systems in a cloud computing environment, one or more physical and/or virtual machines accessed via the Internet, other types of physical or virtual computing devices, and/or components thereof.

The term population table is the main table of the problem to be solved. It defines the statistical population and contains the target values. For a given problem, there is only one population table. The problem also contains at least one peripheral table. A peripheral table contains data that needs to be aggregated before it can be joined onto the population table using a join key. A peripheral table does not typically contain target values, which are values to be predicted (e.g., one or more columns in the population table). However, in some cases, the peripheral table (or tables) is identical to the population table (also known as a "self-join" scenario). This can occur in time series applications, such as sales prediction (e.g., predicting tomorrow's sales based upon average sales for that day of the week from a data set). A match is a combination of two samples in two different tables that have the same join key. The value to be aggregated is determined by the match and other circumstances that are defined in advance. For instance, the value to be aggregated can be a column in the peripheral table, or several columns in the population table and the peripheral table that are combined by some predefined mathematical equation, or learnable weight. For example, a shop may have a "normal price" and an "actual price", where the actual price is the amount that a customer actually paid for an item. The actual price may differ from the normal price because the customer has a coupon or other discount voucher. As noted herein, approaches can account for differences between such values (e.g., normal v. actual price) as a value to be aggregated. An activated match is included in the aggregation. By contrast, a deactivated match is ignored by the aggregation. A condition is applied to the aggregation, e.g., after the WHERE keyword in SQL. Conditions impact the activation status of a match.

An aggregation function may be understood as a function that calculates one or more values (also referred to as aggregation results) from a data set, also described as sample data or sample data set. Examples of an aggregation function are: SUM (which outputs the sum of sample data); AVG (which outputs an average or arithmetic average of sample data); MIN and MAX (which output the minimal and maximal value of the sample data, respectively); MEDIAN (which outputs the median value of the sample data); COUNT (which outputs the number of items included in the sample data); VAR (which outputs the variance of the sample data); STDDEV (which outputs a standard deviation of the sample data). More generals, an aggregation function may be understood as a function that calculates one or more values from a data set, wherein the number of calculated values is smaller than the amount of values included in the sample data set.

A sample data set on which the aggregation function is applied may be initially sorted in any tables or it may be calculated from stored tables. For example, the differences between two columns may first be calculated and these differences may form one sample data set from which the aggregation function calculates a feature value.

A condition may be understood as an instruction how to select specific data from the sample data. The condition may thus define which of the sample data is aggregated with the aggregation function and which sample data is ignored. If there are several conditions for one aggregation function, a combination of TRUE and NOT TRUE results from the conditions may define whether or not sample data is aggregated by the aggregation function. Data that is selected through the conditions to be aggregated with the aggregation function is also referred to as an active match or being activated; whereas data that is judged by the conditions as not to be aggregated is also referred to as an inactive match or as being deactivated.

In some embodiments, the conditions define groups and each sample data value within the same group is assigned the same weight whereas sample data values in other groups are assigned other weights. Also when weights are used, conditions can define that, if one or more specific conditions are met/not met, the corresponding sample data values are deactivated and not included in the aggregation.

The optimization criterion formula may comprise one or more formulas that describe how well the aggregation results of a feature relate to the target values. For example, a prediction model may be used, such as a linear regression, with the aggregation results as values of the/an independent variable to predict the target values, i.e. to determine coefficient(s) of the prediction model that describe how aggregation results relate to target values. Discrepancies between the aggregation results and results from the prediction model may be used by the optimization criterion formula to calculate the quality. In particular, the optimization criterion formula may depend on residuals or pseudo-residuals. Examples of the optimization criterion formula are formulas to calculate an R-squared value (a coefficient of determination), e.g., a proportion of the variance in the target from the prediction. Another example is the squared loss function, which calculates the sum of squared difference between the prediction and the target. Similarly, other loss functions may be used.

A feature may be understood as a mathematical expression comprising an aggregation function to calculate an aggregation value from sample data (also referred to as sample i). The aggregation value is also referred to as the value of the feature for sample i and denoted as $\nabla f_{r,i}$.

In the present disclosure, indices may be written as subscript or regular characters, without any difference in the meaning being intended. For example, w0 and $w_0$ may be used interchangeably. The expressions "optimization criterion formula", "optimization criterion function" and "optimization criterion" may be understood as synonyms.

Computer System and Example Components

Turning now to FIG. 1, an illustrative environment 100 for implementing the methods and/or systems described herein is shown. In particular, a computer system 102 is shown as including a computing device 104. Computing device 104 can include, e.g., a feature identification engine 106 which may include, e.g., one or more sub-systems (feature identification algorithm 120 described herein) for performing any/all of the processes described herein and implementing any/all of the embodiments described herein.

Computer system 102 is shown including a processing unit (PU) 108 (e.g., one or more processors), an I/O component 110, a memory 112 (e.g., a storage hierarchy), an external storage system 114, an input/output (I/O) device 116 (e.g., one or more I/O interfaces and/or devices), and a communications pathway 118. In general, processing unit 108 can execute program code, such as feature identification engine 106, which is at least partially fixed in memory 112. While executing program code, processing unit 108 can process data, which can result in reading and/or writing data from/to memory 112 and/or storage system 114. Pathway 118 provides a communications link between each of the components in environment 100. I/O component 110 can comprise one or more human I/O devices, which enable a human user to interact with computer system 102 and/or one or more communications devices to enable a system user to communicate with the computer system 102 using any type of communications link. To this extent, feature identification engine 106 can manage a set of interfaces (e.g., graphical user interface(s), application program interface(s), etc.) that enable system users to interact with feature identification engine 106. Further, feature identification engine 106 can manage (e.g., store, retrieve, create, manipulate, organize, present, etc.) data, through several modules contained within or accessible via the feature identification algorithm 120 (i.e., modules 122). Feature identification algorithm 120 is shown by example as being a sub-component of feature identification engine 106. However, it is understood that feature identification algorithm 120 may be a wholly independent system or set of instructions (e.g., logic stored in a separate location and/or executed on a distinct computing device).

The computer system 102 is programmed to perform a set of tasks used by the feature identification engine 106. In some cases, memory 112 storing the feature identification engine 106 and the feature ID algorithm 120 can include various software modules 122, configured to perform different actions. Example modules can include, e.g., a comparator, a calculator, a determinator, etc. One or more modules can use algorithm-based calculations, look up tables, software code, and/or similar tools stored in memory 112 for processing, analyzing, and operating on data to perform their respective functions. Each module discussed herein can obtain and/or operate on data 130 from exterior components, units, systems, etc., or from memory 112 of computing device 104.

In some cases, the modules 122 include one or more statistical predictive models, which can include multiple layers of models, calculations, etc., each including one or more adjustable calculations, logical determinations, etc., through any currently-known or later developed analytical technique for predicting an outcome based on raw data. As described herein, the feature identification engine 106 can be configured to use data 130, including feature data, condition data, optimization criteria data, target value data, aggregation function data, etc. These data 130 can be used as inputs to further adjust logic in the feature ID algorithm 120 as discussed herein. Modules 122 can implement one or more mathematical calculations and/or processes, e.g., to execute the machining learning and/or analysis functions of the feature identification engine 106.

Where computer system 102 comprises multiple computing devices, each computing device may have only a portion of feature identification engine 106 fixed thereon (e.g., one or more modules 122). However, it is understood that computer system 102 is only representative of various possible equivalent computer systems that may perform a process described herein. Computer system 102 can obtain or provide data, such as data stored in memory 112 or storage system 114, using any solution. For example, computer system 102 can generate and/or be used to generate data from one or more data stores, receive data from another system, send data to another system, etc.

Figure 2:
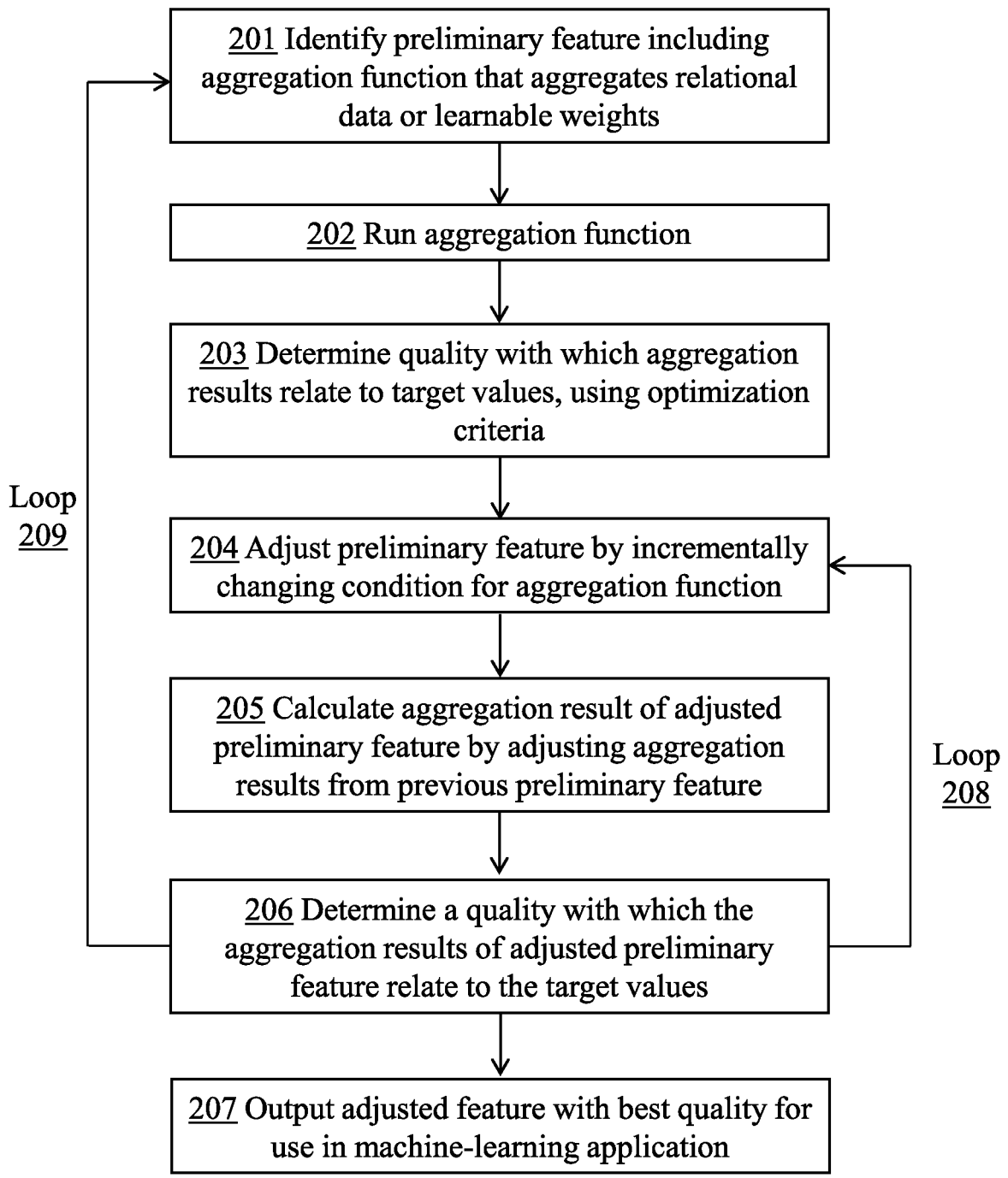
FIG. 2 is a flow diagram illustrating processes in an approach for generating features for machine learning applications according to embodiments of the disclosure.

Using Feature Identification Engine to Generate a Feature for a Machine Learning Application FIG. 2 is a flow diagram illustrating processes in generating a feature for a machine learning application. As shown, approaches can include:

Process 201: identifying a preliminary feature comprising an aggregation function. In particular implementations, each feature is attributed to a single aggregation function. The aggregation function may be used to aggregate relational sample data or learnable weights applied to the sample data.

Process 202: calculating aggregation results with the aggregation function. In particular implementations, the sample data comprises several sample data sets and the aggregation function is applied on each sample data set. For example, the aggregation function may be a SUM function and outputs for each sample data set a respective sum, referred to as an aggregation result.

Process 203: determining, based upon an optimization criterion formula, a quality with which the aggregation results relate to target values. The optimization criterion formula may, for example, comprise a loss function such as a squared loss function that uses quadratic differences to target values, or a log loss function that uses the logarithm of a respective difference to a target value. A difference may be calculated between an aggregation result and a target value. The quality may be the value output by the optimization criterion formula; in the case of a loss function a smaller value indicates a better quality. The optimization criterion formula may also comprise a reward function or R-squared function which again calculates a value (quality) from the aggregation results and the target values; in this case a higher value indicates a higher quality.

Process 204: adjusting the preliminary feature by incrementally changing a condition applied to the aggregation function. The condition may determine which sample data or how sample data is used for calculating the aggregation results. For example, only if sample data meets the condition, it is aggregated with the aggregation function. As an example, the condition may define a threshold and only sample data below or above the threshold will be aggregated by the aggregation function. As described elsewhere in this disclosure in greater detail, a condition is incrementally changed; in the case of a threshold, the threshold is changed by a (small) step such that the change in the condition affects only a small fraction of the sample data, in particular at most 1% or 5% of the sample data. Efficiency gains possible through incremental changes will be easily understood in the following description.

Process 205: calculating aggregation results of the adjusted preliminary feature by adjusting the aggregation results from a previous preliminary feature. In particular implementations, an adjusted preliminary feature differs from a previous preliminary feature in that a condition is incrementally varied and affects only a small portion of the sample data. Hence it may accelerate calculations if it is determined how the aggregation results from a previous preliminary feature are to be adjusted instead of calculating all aggregation results anew. For example, the changed condition may result in that some sample data sets are not affected at all. An aggregation result for such a sample data set does not need to be calculated anew but rather the aggregation result from a previous preliminary feature may be used. Furthermore, if only a fraction of the sample entries within one sample data set are affected by the change in the condition, the previous aggregation result may be adjusted by adding an aggregation result of the fraction of sample entries: For example, the condition may be a threshold that is changed from a value x to x+1, resulting in that just three more sample entries within a sample data set of, e.g., 10,000 values, meet the condition and shall be included in the aggregation; the aggregation function may be a SUM function and now the sum of the three identified sample entries is added to the previous aggregation result, i.e., the sum of the sample entries covered by the previous threshold of x. Using such previous aggregation results is particularly useful in combination with incremental changes which typically require merely small adjustments to previous aggregation results. Hence, a previous aggregation result may be merely changed by the effect that the sample data entries affected by the change of the condition in process 204 has on the previous aggregation result; this procedure may also be described as incrementally adjusting or updating the previous aggregation result. In particular cases, calculating the result of the changed aggregation function includes using only a difference between the result from a current aggregation function and the result from a previous aggregation function.

Process 206: determining a quality with which the aggregation results of the adjusted preliminary feature relate to the target values. This determination may be carried out as described above, using the optimization criterion function. However, it may be computationally more efficient not to perform the whole calculations of the optimization criterion function for each incremental change but rather to use and adjust previous results. In some implementations, an optimization criterion update formula may be used to calculate a quality for the present preliminary feature with the changed condition. The optimization criterion update formula may describe how the quality previously calculated for previous aggregation results is to be adjusted to account for the incremental change. In some cases, the incremental change of a condition may result in that many of the aggregation results remain the same while just a few of the aggregation results change. The optimization criterion update formula may now use aggregation results from a previous preliminary feature. The optimization criterion update formula may also include mathematical expressions that describe how a changed aggregation result affects the quality. In particular, if an aggregation result changes, the impact of the previous aggregation result may be subtracted and the impact of the changed aggregation result may be added.

Process 207 (optional, in some implementations): output the adjusted feature for use in the machine-learning application. In certain implementations, only the adjusted feature having the best quality is output. In particular implementations, as noted herein, quality is defined by the optimization criterion, for example, by maximizing R-squared or minimizing the squared loss.

In various implementations, in loop 208, processes 204 through 206 are repeated for a plurality of incremental changes, and a feature is selected that yields the best quality. In some implementations, the quality corresponds to the result of a loss function and hence the best quality is the smallest value calculated for any of the preliminary features. In other implementations, the quality corresponds to a result of a reward function or R-squared function and hence the best quality is the largest value calculated for any of the preliminary features.

In processes 201 and 202, identifying a feature comprising an aggregation function and calculating aggregation results with the aggregation function may be performed with or without a condition being applied. If a condition is applied, the condition in process 204 may be understood as a different or varied condition. Process 202 may also use a condition such that all data is aggregated. For example, the condition may define a threshold such that all sample data is on the same side of the threshold. Process 204 then changes this threshold such that the condition applies only to a part of the sample data. Through loop 208 the threshold is consecutively further varied. In this way, the condition is incrementally changed, and each time a quality associated with this condition is calculated in process 206. For example, the loop 208 may be repeated twenty or more times and each time the condition is varied such that a smaller share of the sample data is aggregated. In other implementations, process 202 may use a condition which is set such that only a small fraction of the sample data, e.g., at most 5% or 10%, is aggregated, and then process 204 changes the condition such that a larger fraction of the sample data is aggregated. Each time loop 208 repeats, the condition is changed to increase this fraction. For example, the loop 208 may be repeated twenty or more times and each time the condition is varied such that a larger share of the sample data is aggregated.

A condition may refer to the sample data to be aggregated or to other data associated with the sample data. For example, the sample data may be any numerical values whereas the other data may be calendar data. Each calendar date is associated with zero, one or more entries of the sample data. A condition may now select specific calendar dates and the aggregation function only aggregates the sample data associated with the selected calendar dates. Calendar dates are just one example, and instead a condition may refer to any other data (numerical values or categorical indications) associated with the sample data.

In additional implementations, in loop 209, processes 201-206 are repeated incrementally for a plurality of additional conditions. In these cases, the adjusted feature becomes the preliminary feature during the repeating of process 201. As an example, the first condition may define an upper threshold (the value of the upper threshold being determined in process 206 as the upper threshold with which the best quality can be achieved) and an additional condition may define a lower threshold for which again the value is determined in process 206. Still further additional conditions may then define further upper and lower thresholds that form several spaced intervals of data to be aggregated.

In additional cases, the processes shown in loop 209 (repeating processes 201-206) can be performed using a distinct preliminary feature. That is, processes 201-206 can be repeated for a distinct preliminary feature on the same condition. In these cases, following repeated process 206, performed using a distinct preliminary feature, the method can further include additional processes:

(I) calculating a pseudo-residual for the adjusted feature; and (II) training the distinct preliminary feature to predict an error from the adjusted feature.

In further implementations, process 202 does not aggregate the sample data itself, but instead learnable weights are assigned to the sample data and used as values to be aggregated. For example, initially the same weight may be assigned to all sample data, or the sample data may be split into a first group and a second group, based on an initial condition, and a first weight is assigned to the sample data in the first group and a different second weight is assigned to the sample data in the second group. The aggregation function then does not aggregate the sample data itself but the weights assigned to the sample data. The condition defines how the sample data is split into groups and thus defines the number of sample data entries per group. With the number of sample data entries per group, an algorithm may be employed to calculate the best weights (for these numbers of entries per group) to describe given target values. Each time the condition is varied, the weights are calculated anew and again a quality is determined with which the target values can be predicted, using this condition.

An implementation of the method which uses learnable weights may also be described with the following processes:

Process A) set a (preliminary) condition that splits sample data into two groups; determining the number of sample data entries per group; for assigning a respective weight to each group of sample data: use a function for calculating the weights of the groups based on a given loss function, given target values, and the respective number of sample data entries in each group; use an aggregation function to calculate an aggregation result by aggregating all weights assigned to the sample data; and use an optimization criterion function to determine a quality with which the aggregation results relate to the target values;

Process B) (incrementally) change the preliminary condition to split the sample data differently into two groups and repeating process A) for each changed preliminary condition; and set the preliminary condition with the highest quality as a fixed condition;

Process C) test different preliminary subconditions that each split one of the groups set with the fixed condition into two new groups and perform process A) for each of the preliminary subconditions; set the preliminary condition with the highest quality as a fixed subcondition;

repeating process C) to determine and set further subconditions;

output the set conditions and subconditions, optionally together with the corresponding determined weights.

The above-noted processes are described in greater detail by way of the following examples.

Example Calculations: Pseudo-Residuals

In some cases, pseudo-residuals are calculated according to one or more equations. For example, Let L( . . . ) be a loss function, yi be the target for sample i and y^t−1,i be the prediction generated from all previous predictors in the ensemble. Given the current prediction, begin by calculating the pseudo-residuals. There are a number of ways this can be performed, usually based on the first and second derivatives of the loss function L( . . . ):

$$g_i := \frac{\partial L(\hat{y}_{t-1,i}; y_i)}{\partial \hat{y}_{t-1,i}}. \tag{1}$$

$$h_i := \frac{\partial \partial L(\hat{y}_{t-1,i}; y_i)}{\partial \hat{y}_{t-1,i} \partial \hat{y}_{t-1,i}}. \tag{2}$$

Negative gradients can be used as pseudo-residuals, which are denoted as $\epsilon_i$:

$$\epsilon_i := -g_i, \tag{3}$$

An alternative way to calculate the pseudo-residuals is to use a Taylor approximation:

$$\epsilon_i := -\frac{g_i}{h_i}. \tag{4}$$

Yet another approach is to use target variables (e.g., in this case, calculating an update rate is unnecessary, and a difference between the features will be based on randomness generated through bootstrapping or other means):

$$\epsilon_i := y_i, \tag{5}$$

Example Calculations: Optimization Criteria

Various optimization criteria that can be incrementally updated, can be used in conjunction with the disclosed implementations. One optimization criterion that can be used for the purposes of this study is R-squared. For this approach to work, one must express R-squared in a way that can be incrementally updated. This is achieved as follows: Let $\nabla f_{t,i}$ be the value of a generated feature for sample i. Let I be the number of samples in the population table. As noted herein, Ei denotes the pseudo-residual. The goal is then to manipulate the ft,i in order to maximize the following, referred to as R-squared:

$$\frac{\left(I * \sum_i \nabla f_{t,i} \epsilon_i - \left(\sum_i \nabla f_{t,i}\right) * \left(\sum_i \epsilon_i\right)\right)^2}{\left(\sum_i \nabla f_{t,i}^2 - \left(\sum_i \nabla f_{t,i}\right)^2\right) * \left(\sum_i \epsilon_i^2 - \left(\sum_i \epsilon_i\right)^2\right)}. \tag{6}$$

The R-squared as expressed in equation (6) can be incrementally updated, as reflected in equation (6a). Let Sxy:=

$$\Sigma_i \nabla f_{t,i} \epsilon_i, S_x := \Sigma_i \nabla f_{t,i}, S_{xx} := \Sigma_i \nabla f_{t,i}^2, \tag{6a}$$

When sample i has changed, equations (6) and (6a) can be incrementally updated as follows:

$$S_{xy}^{new} = S_{xy}^{old} + (\nabla f_{t,i}^{new} - \nabla f_{t,i}^{old}) \epsilon_i$$

$$S_x^{new} = S_x^{old} + \nabla f_{t,i}^{new} - \nabla f_{t,i}^{old}$$

$$S_{xx}^{new} = S_{xx}^{old} + \nabla f_{t,i}^{new} \nabla f_{t,i}^{new} - \nabla f_{t,i}^{old} \nabla f_{t,i}^{old}. \tag{7}$$

The new R-squared can then be calculated as follows:

$$\frac{\left(I * S_{xy}^{new} - S_x^{new} * \left(\sum_i \epsilon_i\right)\right)^2}{(S_{xx}^{new} - S_x^{new2}) * \left(\sum_i \epsilon_i^2 - \left(\sum_i \epsilon_i\right)^2\right)}. \tag{8}$$

Example Calculations: Condition Trees

It is possible to consider the case of the conditions, "WHERE some columns>0.5" and "WHERE some column>0.6". In all likelihood, only a small share of samples will be affected by this incremental change. It would therefore be inefficient to recalculate all of the samples. In this section, an efficient, greedy and decision-tree-like approach to solve this problem is presented. For this approach to be effective, any optimization criterion that can be incrementally updated is required. Depending on the conditions, every match can either be activated or deactivated. Aggregation should also be expressed in a form that allows for incremental updates. These incremental updates are discussed further herein. It is also possible that the path from the peripheral table to the population table contains more than just one aggregation. There can be a set of nested aggregation such as the SUM of a COUNT or the AVG of a SUM. Therefore, it must be possible to update aggregations based not just on the changing of the activation status of a match, but also based on the changed values of another aggregation. This is discussed further herein. The remaining question is how to find an optimal set of conditions that will help maximize the optimization criterion. As shown herein, a greedy, tree-like model was used in this example, which is referred to as a condition tree herein. An example of a condition tree is provided in FIG. 3.

In this example, all matches are activated by default. A condition is then applied that can either be true or false. If the condition is true for the match, its activation status is changed. If the condition is false, the activation status is left unchanged. The activation status also determines which condition is applied next. In embodiments, where the values to be aggregated are learnable weights, the conditions additionally determine which weight to use. Once the end of the condition tree is reached, the status of the match is either activated or deactivated. All activated matches will be included in the aggregation. All deactivated matches will be ignored by the aggregation.

Figure 3:
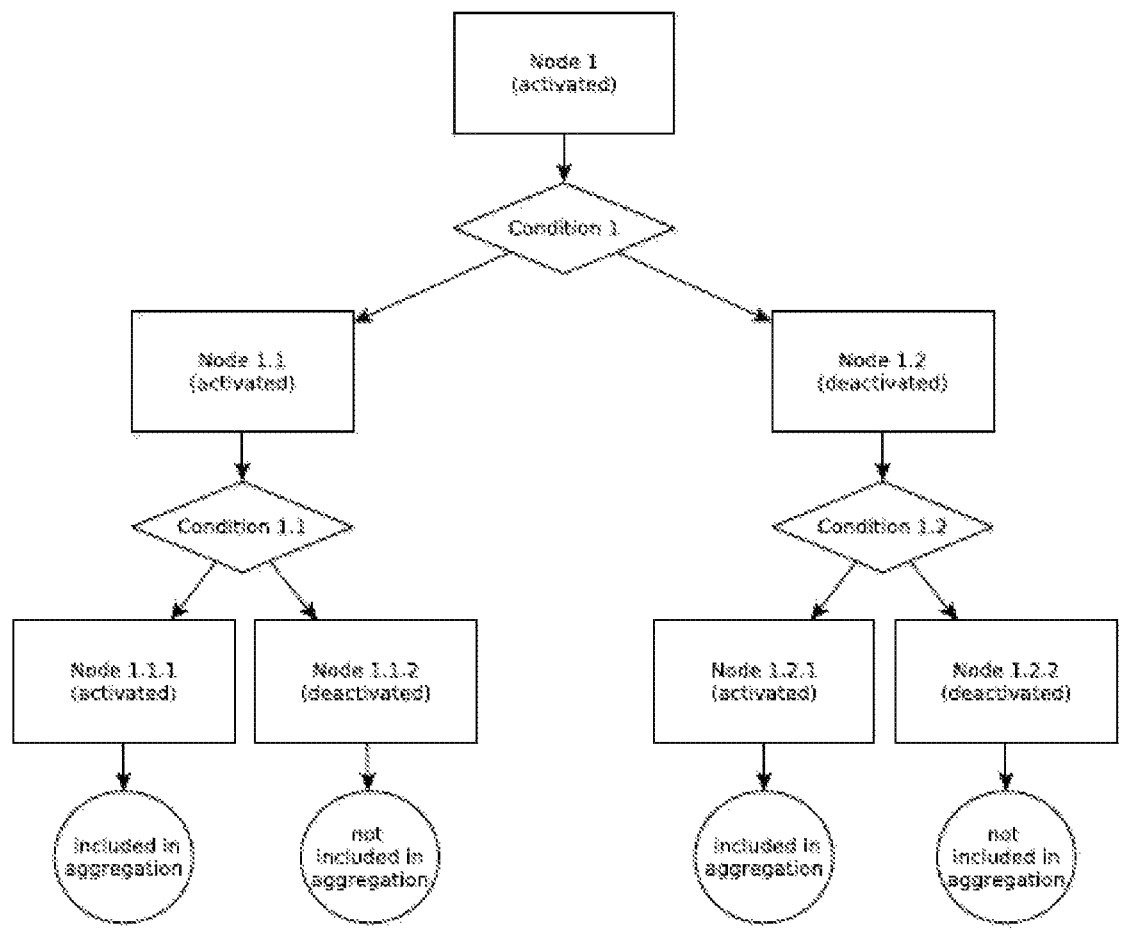
FIG. 3 illustrates an example decision tree for performing functions according to various embodiments of the disclosure.

In some cases, condition trees can be expressed in SQL code. For example, it is possible to express all paths through the condition tree that lead to the match being activated and express them as conditions. For instance, the condition tree expressed in FIG. 3 is expressed in pseudo-SQL code in FIG. 4.

Example Calculations: Training Condition Trees

Condition trees are trained using a greedy algorithm. In one approach, at every node, iterate through a set of possible conditions, changing the activation status of all matches that are affected by the condition. Then choose the condition that constitutes maximum improvement of the optimization criterion. For the training approach to work, the following functions are useful:

1. A binning function, denoted as bin Junction. This function determines possible ways to split the matches, based on how this is done conventional approaches for decision trees (e.g., described in "Approximate splitting for ensembles of trees using histograms," Chandrika Kamath et al., incorporated by reference herein). One way is to define a set of threshold values and then separate the matches depending on whether the corresponding entries in the matches are smaller of greater than the threshold. However, other methods are possible, such as splitting along categorical variables.

2. A function for calculating incremental updates, denoted update_incrementally. This function first identifies all matches for which the activation status needs to be changed since the last time update_incrementally or activate all was called. After changing their activation status, it incrementally updates the aggregations. Examples for incrementally updating the aggregations are described herein. For all samples in the population table that have been affected by the changing matches, it then incrementally updates the optimization criterion. Examples for this process are provided in equation (7) and equation (8). Pseudocode for this function is provided in FIG. 5. In embodiments, where the values to be aggregated are learnable weights, update_incrementally will also calculate the learnable weights.

3. A function for finding the best split, denoted find_best_split. The best split is the one that leads to the maximum improvement of the optimization criterion. This best split may be used as one condition.

4. A stopping criterion, denoted as the function satisfies_stopping_criterion. The conventional usage of decision trees contains many options for stopping criteria, such as a maximum depth, a minimum requirement on the improvement of the optimization criterion, a minimum number of samples on each new leaf or a combination of such factors.

5. A function for updating the condition tree, denoted update_condition_tree. The function takes the best split and updates the current node of the condition tree according to the split, thus separating the matches into a set for which the activation status is changed and a set for which the activation status is not changed.

FIG. 6 shows a training algorithm for a condition tree that is used in some implementations of the invention.

Example Calculations: Train Simple Regression Model

The next step is to train a simple prediction model with the pseudo-residual Ei as the dependent and the feature values ∇ft,i as the independent variable. This step can be skipped, if the pseudo-residuals are simply the targets or when the values to be aggregated are learnable weights. Predictions generated by the regression model can be denoted as $\bar{\nabla} y\char`\^ t,i$. Examples for such a model include a linear regression or a regression tree.

Example Calculations: Calculate the Update Rate

The final step is to find the update rate $\alpha$ such that it minimizes L(yi, y^t−1, i+a*∇y^t,i). This step can be skipped, if the pseudo-residuals are simply the targets. This can be achieved using a line search or a second-order Taylor approximation.

It still remains true that:

$$gi:\partial = L(y\char`\^ t-1, i:yi) \text{ and } hi:=\partial\partial L(y\char`\^ t-1, i:yi)$$

The update rate can then be calculated as follows:

$$\alpha := \frac{\sum_i g_i \nabla \hat{y}_{t,i}}{\sum_i h_i \nabla \hat{y}_{t,i} \nabla \hat{y}_{t,i}}. \tag{9}$$

Example Calculations: Incrementally Update Aggregation Function(s)

Incremental updating is highly beneficial to efficient processing according to various implementations, both in terms of time and memory. Examples are provided above for aggregations where the incremental update is comparatively trivial, such as COUNT, AVG or SUM.

By contrast, this section is dedicated to introducing an approach for incrementally updating aggregations for which incremental updates are non-trivial. In order to keep the approach scalable, an algorithm was developed according to various implementations that requires little time and memory to achieve the above-noted goal.

In order to accomplish this, two arrays of matches are used, denoted matches and ptr. As noted herein, a match connects samples in two different tables, one of which is aggregated and then joined to the other. For simplicity, the former table is referred to as the input table and the latter as the output table.

The index of sample in the output table associated with a match is referred to as ix_output and it is assumed that there is a function denoted get_ix_output( . . . ) which returns the ix_output of a match. Moreover the function get_value ( . . . ) returns the underlying value to be aggregated (which can be a value in the input table or a combination of several values in the input and output table).

The array matches is sorted by the ix_output and the value to be aggregated, in that order. A single element in ptr is denoted p.

The function that returns the element in matches from p is denoted get_match( . . . ). Moreover, the elements ptr know the locations of their corresponding entries in matches. S solution that fulfills the latter requirement is to have ptr be a set of pointers to matches, but other approaches are possible, such as having the elements in ptr contain pointers or indices that signify the corresponding element in ptr.

It can also be assumed that the operators ==, >, <, <= and >= are defined on the matches. These operators compare the position in the array matches rather than the underlying values. Moreover, the operators ++ and −− move the match to the next/previous position in matches. One way to implement this is to use iterators, but other ways, such as using operator overloading or custom methods, are possible.

In addition to matches and ptr, the following data structures are required for at least some aggregations: An array denoted counts, which counts the active matches for each ix_output, an array denotes sums, which stores the sums of the currently aggregated values, an array denoted values, which stores the current values aggregation for each ix_output and an array denoted current_matches, which dynamically stores matches that are of significance for incrementally updating certain aggregations.

Also, it is assumed that there is a NULL value. This NULL can either be nan or some imputation value, such as 0.0, chosen by the user. Additionally, this approach also requires a data structure denoted unique_indices, which can store all indices that have been altered by an aggregation without containing duplicate entries. It is assumed that the data structure (e.g., array, hash map, etc.) has a method denoted .insert( . . . ), which adds an index if it is not already contained in the data structure. Options for applying this approach are described in the subsequent sections.

Moreover, the matches need to contain a Boolean variable activated, which signifies whether the match is currently activated. Finally, some aggregations require the functions find_next_smaller and find_next_greater, which return the next smaller/greater activated match and can be efficiently implemented as shown in FIG. 7.

It is possible to begin by describing the algorithm for incrementally updating the COUNT aggregation in pseudocode, which is one useful aggregation to update incrementally, as illustrated in FIG. 8.

The SUM aggregation function is shown in FIG. 9.

The AVG aggregation is more complicated than the SUM or COUNT aggregations, because the AVG aggregation must maintain the sums and counts, as shown in FIG. 10.

The VAR or VARIANCE keeps track of more sufficient statistics, as shown in FIG. 11.

The STDDEV aggregation builds on VAR, as shown in FIG. 12.

The third moment, or SKEWNESS, can be updated incrementally, as shown in the algorithm depicted in FIG. 13.

FIG. 14 shows the MAX aggregation, which is the first aggregation that requires the matches to be sorted. This algorithm can be used for incrementally updating the MAX aggregation.

After developing the algorithm for incrementally updating the MAX aggregation, the MIN aggregation can be incrementally updated, using a slightly modified version, as depicted in FIG. 15.

The median aggregation follows a similar approach to the MIN/MAX aggregation, but with some additional challenges. FIGS. 16 and 17 illustrate algorithms for calculating the median aggregation. FIG. 16 shows the algorithm for activating the MEDIAN aggregation, and FIG. 17 shows the algorithm for deactivating the MEDIAN aggregation. In this example, the greater value is stored in current_matches, which is an arbitrary convention. In this case, the smaller value could be stored as well.

The COUNT DISTINCT aggregation can be updated as shown in FIGS. 18 and 19. FIG. 18 shows the algorithm for activating the COUNT DISTINCT aggregation. FIG. 19 shows the algorithm for deactivating the COUNT DISTINCT aggregation.

The above-noted algorithms can have various performance implications. For example, let l be the number of matches (thus the length of the array matches), let n be the number of matches per ix_output, let t be the number of bins returned by bin_function, and let p be the number of ix_output that is needed to update within one bin returned by bin_function.

For comparison, it is beneficial to first discuss the time complexity of updating aggregations in a non-incremental way. Non-incremental updates mean that every time there is a change to one value going into the aggregation, the aggregation must be recalculated over all values that go into that aggregation. If the time complexity of an aggregation is denoted in n as Oa(n), then the cost of such an operation will be O(Oa(n)tp). Oa(n) is likely to be linear for most aggregations, but not for COUNT DISTINCT and MEDIAN.

Note that t and p are inversely related, but this relationship is unlikely to be linear, meaning that there is a performance penalty to having many bins. Also note that this operation is particularly expensive when the number of matches per ix_output is very high. This can be a considerable scalability problem, because sampling from the population table implies that the number of ix_outputs is going to be constant, but having many of matches per ix_output (high n) also implies a higher p. This is the case, because when keeping the number of ix_outputs constant, n and l are linearly related to each other, which means that there must be more matches within one bin, and most likely leads to a higher p. The only scenario where this would not be the case is if all additional matches fall into the same bin, which is unlikely.

Coupling t with l, as most conventional implementations do, will reduce p, but not linearly to the increase in t. In other words, given a constant number of ix_outputs, the time complexity of this approach in l is O(l) in the best case, but worse than O(l) under a more probable scenario.

Contrast this with the time complexity of incremental updates: it is possible to see that the time complexity of incrementally updating the COUNT, SUM, AVG, VAR, STDDEV and SKEWNESS aggregations as described above is exactly O(1). It is also possible to see that the time complexity of activating a sample in the MIN and MAX aggregation is O(1). Closer analysis reveals that the time complexity of deactivating a sample is also O(1). This is the case, because the functions find next smaller and find next greater always move in one direction. Therefore, when successively deactivating an array of matches, the maximum number of steps by these functions is l, regardless of n. However, this does require sorting the array matches once at the very beginning of training the multi-relational decision tree. The time complexity of that operation depends on the sorting algorithm, but in many cases is O(l log l).

The time complexity of incrementally updating the MEDIAN aggregation is O(ln) in the worst case and O(l) in the best case. It is difficult to estimate the cost of calculating the MEDIAN globally every time at least one input has changed, because it would require us to make assumptions on the distribution of the matches and their corresponding critical values. What is more, the incremental update will become less expensive when many matches are already aggregated (because it will be easier to find the next split), whereas the global approach will become more expensive. That means as the tree grows deeper, it is more likely that many matches are activated and will be unaffected by the most recent split. In such a scenario, incremental updates will be more efficient.

The time complexity of incrementally updating the COUNT DISTINCT aggregation will depend on the number of unique values per ix output: the more values, the cheaper it gets to update COUNT DISTINCT. Therefore, the worst case is that there is only one unique value per ix output, in which case the time complexity is O(ln) in addition to the cost for sorting once in the very beginning. However, this worst case is unrealistic in practice. What is more, like the MEDIAN aggregation, the COUNT DISTINCT aggregation will become cheaper as more values are aggregated.

As shown in the examples herein, the incremental updating algorithms discussed in this section can yield considerable reductions in time complexity when compared to the conventional approach of having to recalculate the aggregation whenever at least one single match has changed within a bin. This is particularly true for the, "classical" aggregation functions COUNT, SUM, AVG, MIN and MAX, as well as VAR, STDDEV and SKEWNESS. The performance gain of incrementally updating COUNT DISTINCT and MEDIAN will depend on the exact implementations of the aggregation functions in the case of non-incremental updates. Moreover, the time complexity of incrementally updating the aggregations is unrelated to t. This is another advantage to the various implementations disclosed herein, as it enables trying more bins without any considerable performance costs. Trying more bins allows for finding the ideal condition more accurately.

Example Calculation: Efficient Propagation of Updated Values

In the above section, reference is made to a data structure called unique indices. This data structure keeps all of the ix_output which have been altered when incrementally updating the aggregations. This is beneficial, because it is necessary when deciding to incrementally update the optimization criterion. Incrementally updating this criteria is not possible without knowing which samples need updating.

The purpose of unique_indices is to keep the indices uniquely, meaning that no ix_output should be contained twice. In various implementations, assumptions are made that the data structure has a method denoted .insert( . . . ), which adds an index if it is not already contained in the data structure. As described above, any update of any aggregation will call .insert( . . . ). It is therefore beneficial for performance that this data structure is efficiently implemented. In particular, the process of insertion must be efficient. Several data structures can be used to facilitate this efficiency. Let n be the number of elements already inserted into the structure: (1) A binary search tree: In the worst case, the cost of insertion can be O(n), but on average it will be O(log n); (2) A red-black tree: In the worst case, the cost of insertion can be O(log n), however, there is overhead for potentially having to restructure the tree after an insertion; (3) A hash map: In theory, the cost of insertion should be independent of the number of elements already inserted, but in practice, collisions can occur. However, approaches described herein have an advantage, because the range of the ix_output to insert is known in advance. In this example, let k be the number of elements in the output table and thus the number of different ix_output. Then, use the following data structure: Keep an array of Booleans of size k. Each element in that array represents one ix_output and signifies whether that element has already been inserted. Keep a variable-size container (such as std::vector in C++) that contains the indices. When inserting into unique indices, check the array of Booleans to see whether the element has already been inserted, and if not, append into to the variable-size container. If the variable-size container has been allocated sufficient capacity, then the time complexity of the insertion operation is guaranteed to be O(1). Moreover, the resulting indices will be aligned in memory, which means that iteration through these elements is also fast and efficient.

Example Calculation: Intermediate Aggregations

As noted herein, it is possible that the path from the peripheral table to the population table contains more than just one aggregation. There can be a set of nested aggregations such as the SUM of a COUNT or the AVG of a SUM. Therefore, it must be possible to update aggregations based not just on the changing of the activation status of a match, but also based on the changed values of another aggregation. In this section, any aggregation that is not at the lowest level of this chain is called an intermediate aggregation. This section describes implementing aggregations as intermediate aggregations. Begin by expressing the SUM aggregation in pseudo-code, as represented in FIG. 20 (showing an algorithm for updating AVG as an intermediate aggregation).

Calculating Learnable Weights

When aggregating over columns, the approaches (e.g., algorithms) described herein produce features such as are shown in FIG. 4. These features are very similar to the features a data scientist might write by hand, albeit often more complex. However, they do have a disadvantage, namely that all possible aggregations must be applied to all possible values to be aggregated. This can produce many possible combinations. Therefore, some embodiments aggregate over learnable weights, producing features in the form exemplified in FIG. 21 (which in practice, such features would consist of more than just two conditions). The primary benefit in this scenario is that for every possible aggregation function there is only one possible set of values to aggregate per peripheral table. This greatly reduces the search space. The primary disadvantage is the limitation in the possible aggregation functions.

Optimization Criterion

The optimization criterion used for calculating the learnable weights can be any loss function such as squared loss or log loss, described according to the following examples.

Let $L( \ldots )$ be a loss function, $y_i$ be the target for sample I and $f_{t-1,i}$ be the prediction generated from all previous predictors in the gradient boosted ensemble. The goal is to find a $\nabla f_{t,i}$ that minimizes the loss function over all samples:

$$\min_{\nabla f_{t,i}} \sum_i L(f_{t-1,i} + \nabla f_{t,i}; y_i) \tag{10}$$

For training a new predictor $\nabla f_{t,i}$, follow the xgboost approach of using the second order Taylor approximation:

$$L(f_{t-1,i} + \nabla f_{t,i}; y_i) \approx \tag{11}$$

$$L(f_{t-1,i}; y_i) + \frac{\partial L(f_{t-1,i}; y_i)}{\partial f_{t-1,i}} \nabla f_{t,i} + \frac{1}{2} \frac{\partial \partial L(f_{t-1,i}; y_i)}{\partial f_{t-1,i} \partial f_{t-1,i}} \nabla f_{t,i}^2$$

Let $g_i := \frac{\partial L(f_{t-1,i}; y_i)}{\partial f_{t-1,i}}$ and $h_i := \frac{\partial \partial L(f_{t-1,i}; y_i)}{\partial f_{t-1,i} \partial f_{t-1,i}}$.

Deriving for $\nabla f_{t,i}$ yields:

$$\frac{\partial L(f_{t-1,i} + \nabla f_{t,i}; y_i)}{\partial \nabla f_{t,i}} \approx g_i + h_i \nabla f_{t,i} \tag{12}$$

However, because of the relational nature of the dataset, $\nabla f_{t,i}$ cannot be freely optimized. Instead, it comprises a set of learnable weights $w_0, w_1, w_2, \ldots, w_N$ or w that are aggregated through a series of aggregations. These aggregations need to be linear transformations of the original weights. Examples of aggregations that are linear transformations include SUM and AVERAGE. Based on the nature of these aggregations, it is possible to calculate a set of impact factors $1, \eta_{1,i}, \eta_{2,i}, \ldots, \eta_{N,i}$ or $\eta_i$, which are linear multipliers measuring the impact of each of the weights on $\nabla f_{t,i}$, such that $\nabla f_{t,i}$ can be written as follows:

$$\nabla f_{t,i} = \eta_i^T w = w_0 + \sum_{n=1}^{N} \eta_{n,i} w_n \quad (13)$$

The following is an example to illustrate how ηi is formed. Consider the feature described in FIG. 4. As seen, this feature consists of two weights w1 and w2, as well as the interaction term w0. Suppose that there are five matches between sample i in the population table and the peripheral table. Further suppose that for these five matches, condition1 is true three times and condition2 is true twice. Assuming that the aggregation in use is a SUM aggregation, ∇ft,i can be written as follows:

$$\nabla f_{t,i} = w_0 + 3w_1 + 2w_2 \quad (14)$$

This implies that $\eta_{1,i}=3$ and $\eta_{2,i}=2$. Since w0, w1, w2, ..., wN is the set of learnable weights, it is possible to optimize for those weights. Combining equation (12) and equation (13) yields the following equations:

$$\frac{\partial L(f_{t-1,i} + \nabla f_{t,i}; y_i)}{\partial w_0} = \frac{\partial L(f_{t-1,i} + \nabla f_{t,i}; y_i)}{\partial \nabla f_{t,i}} \frac{\partial \nabla f_{t,i}}{\partial w_0} \approx (g_i + h_i \eta_i^T w), \quad (15)$$

$$\frac{\partial L(f_{t-1,i} + \nabla f_{t,i}; y_i)}{\partial w_n} = \quad (16)$$

$$\frac{\partial L(f_{t-1,i} + \nabla f_{t,i}; y_i)}{\partial \nabla f_{t,i}} \frac{\partial \nabla f_{t,i}}{\partial w_n} \approx (g_i + h_i \eta_i^T w)\eta_{n,i}.$$

When the set of weights (w0, w1, w2, ..., wN) is optimal, the sum of all gradients is zero:

$$\sum_i (g_i + h_i \eta_i^T w)\eta_i = 0. \quad (17)$$

Equation (17) can now be rearranged as follows:

$$\sum_i h_i \eta_i \eta_i^T w = -\sum_i g_i \eta_i. \quad (18)$$

However, equation (18) is an (N+1)×(N+1) system of linear equations that can be solved using standard algorithms, for example, LU decomposition, Gaussian elimination or Cramer's rule.

Fixed Weights

For reasons of efficiency, it is often desirable not to optimize all weights at the same time. For example, let there be a set of fixed weights denoted as wf and let μ be the set of associated impact factors. Equation (17) can then be rewritten as follows:

$$\sum_i (g_i + h_i \eta_i^T w + h_i \mu_i^T w_f)\eta_i = 0. \quad (19)$$

To retrieve a new system of linear equations, it is possible to rearrange equation (19) as follows:

$$\sum_i h_i \eta_i \eta_i^T w = -\sum_i (g_i + h_i \mu_i^T w_f)\eta_i. \quad (20)$$

Regularization

One of the advantages of xgboost is that L2 regularization can be seamlessly integrated into the concept. With a few modifications, the same is true for this approach. For example, let Ri be an (N+1)×(N+1) diagonal matrix that contains the values 1, η1,i, η2,i, ..., ηN,i or ηi on its diagonal. The L2 regularization function R(ηi, w) is then defined as follows:

$$R(\eta_i, w) := \frac{1}{2} w^T R_i w = \frac{1}{2} \sum_n \eta_{n,i} w_n^2 \quad (21)$$

This can also lead to a modification of the optimization criterion. For example, let λ be the L2 regularization term. The goal is to find a ∇ft,i that minimizes the loss function plus the regularization term over all samples:

$$\min_{\nabla f_{t,i}} \sum_i (L(f_{t-1,i} + \nabla f_{t,i}; y_i) + \lambda R(\eta_i, w)) \quad (22)$$

Then, equation (17) can be modified as follows:

$$\frac{\partial L(f_{t-1,i} + \nabla f_{t,i}; y_i)}{\partial w_n} + \lambda \frac{\partial R(\eta_i, w)}{\partial w_n} \approx (g_i + h_i \eta_i^T w)\eta_{n,i} + \lambda \eta_{n,i} w_n \quad (23)$$

In the optimum scenario, the sum of all gradients must be zero for all weights (w0, w1, w2, ..., wN):

$$\sum_i (g_i + h_i \eta_i^T w)\eta_i + \lambda \sum_i R_i w = 0. \quad (24)$$

This leads to a new system of linear equations:

$$\sum_i (h_i \eta_i \eta_i^T + \lambda R_i)w = -\sum_i g_i \eta_i. \quad (25)$$

Regularization and Fixed Weights

When there are fixed weights and regularization, it is possible to combine equation (20) and equation (25) to produce a system of linear equations that appear as follows:

$$\sum_i (h_i \eta_i \eta_i^T + \lambda R_i)w = -\sum_i (g_i + h_i \mu_i^T w_f)\eta_i. \quad (26)$$

Figure 22:
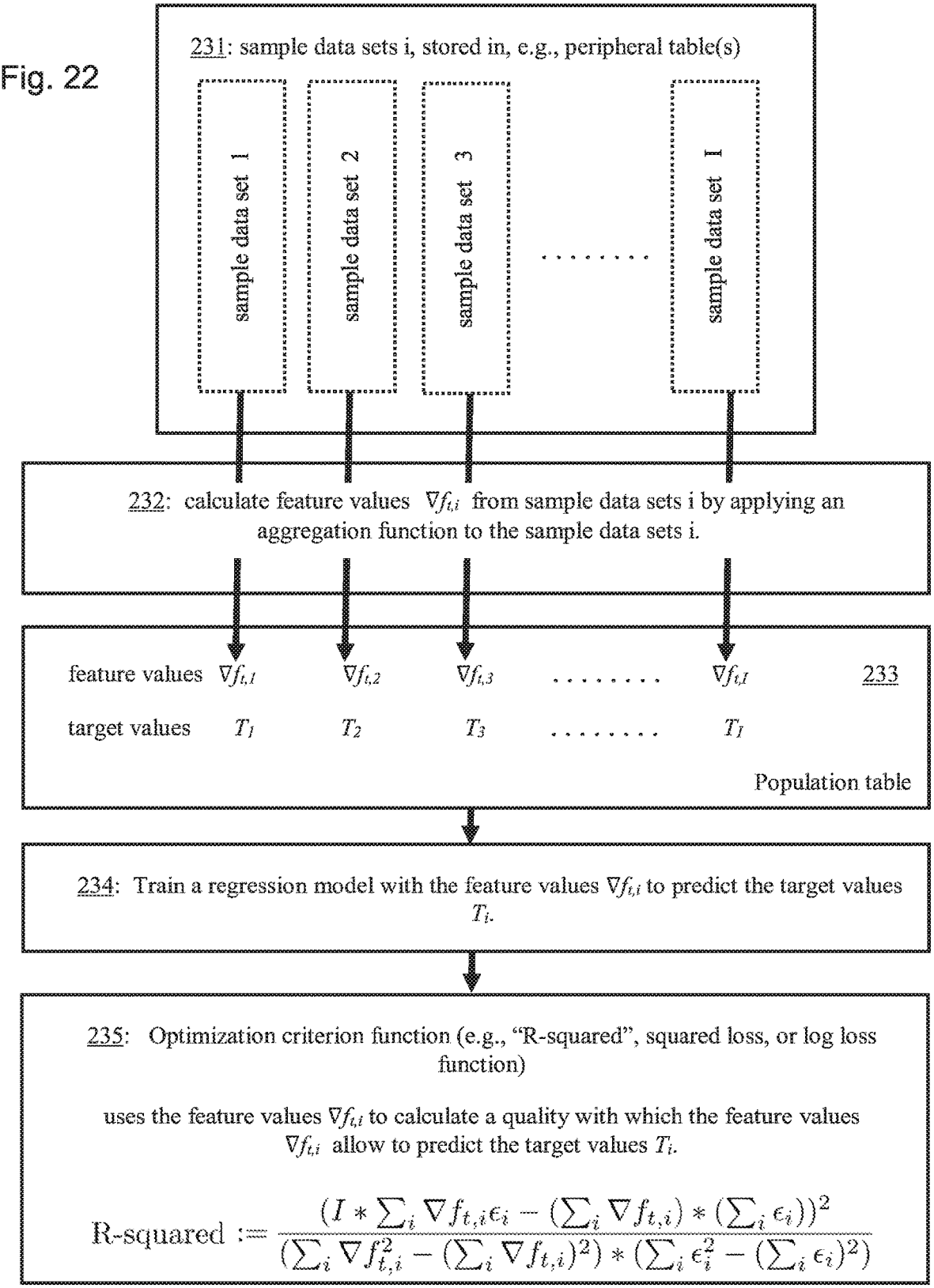

FIG. 22 shows a flow chart illustrating specific implementations of the method of the invention. Reference numeral 231 indicates a plurality of sample data sets i which jointly form the sample data. From this sample data a feature shall be extracted that is suitable to predict target values associated with the sample data. The sample data sets i may be stored in one or more peripheral tables or alternatively in the population table or partly in the population table and partly in one or more peripheral tables.

Reference numeral 232 indicates a process to calculate feature values ∇ft,i from the sample data sets i by applying an aggregation function on the sample data sets i. An aggregation function may be any mathematical function that calculates one value from a sample data set i, for example by summing all values. Also more complex functions may be used to calculate the feature values $\nabla ft,i$. For example, a feature may comprise two or more aggregation functions; the first aggregation function (e.g., a MEDIAN function) aggregates several portions of a sample data set to output several first aggregation results; then the second aggregation function (e.g., a SUM function) aggregates the several first aggregation results to output one (second) aggregation result for this sample data set.

The number of calculated aggregation results/feature values $\nabla ft,i$ may correspond to the number I of sample data sets. These feature values $\nabla ft,i$ are transferred into the population table 233. The population table 233 also includes one target value $T_i$ for each sample data set i, i.e., for each calculated feature value $\nabla ft,i$.

Reference numeral 234 indicates a process of training a regression model with the feature values $\nabla ft,i$ to predict the target values Ti. For example, a linear regression may be used. The regression model uses only values in the population table 233 but not values of the peripheral tables in which the sample data sets i may be stored.

In process 235 an optimization criterion function such as R-squared or a loss function is used to calculate a quality with which the feature values $\nabla ft,i$ predict or allow to predict the target values Ti. For R-squared, a large value indicates a high quality whereas a small value calculated with a loss function indicates a high quality.

The quality depends on how the target values Ti are calculated. With a given aggregation function and given sample data, the target values Ti depend on how the sample data is aggregated, i.e., which part of the sample data is aggregated or which weight is assigned to the sample data when not the sample data itself but the weights are aggregated. One or more conditions are used which define how the sample data is aggregated. The choice of conditions is vital for the resulting quality. However, in principle a huge number of different conditions come into question, which poses the question how to efficiently calculate qualities for a large number of different conditions. This is achieved in implementations of the method of the invention, one such implementation being described in more detail with respect to the flowchart shown in FIG. 23.

Figure 23:
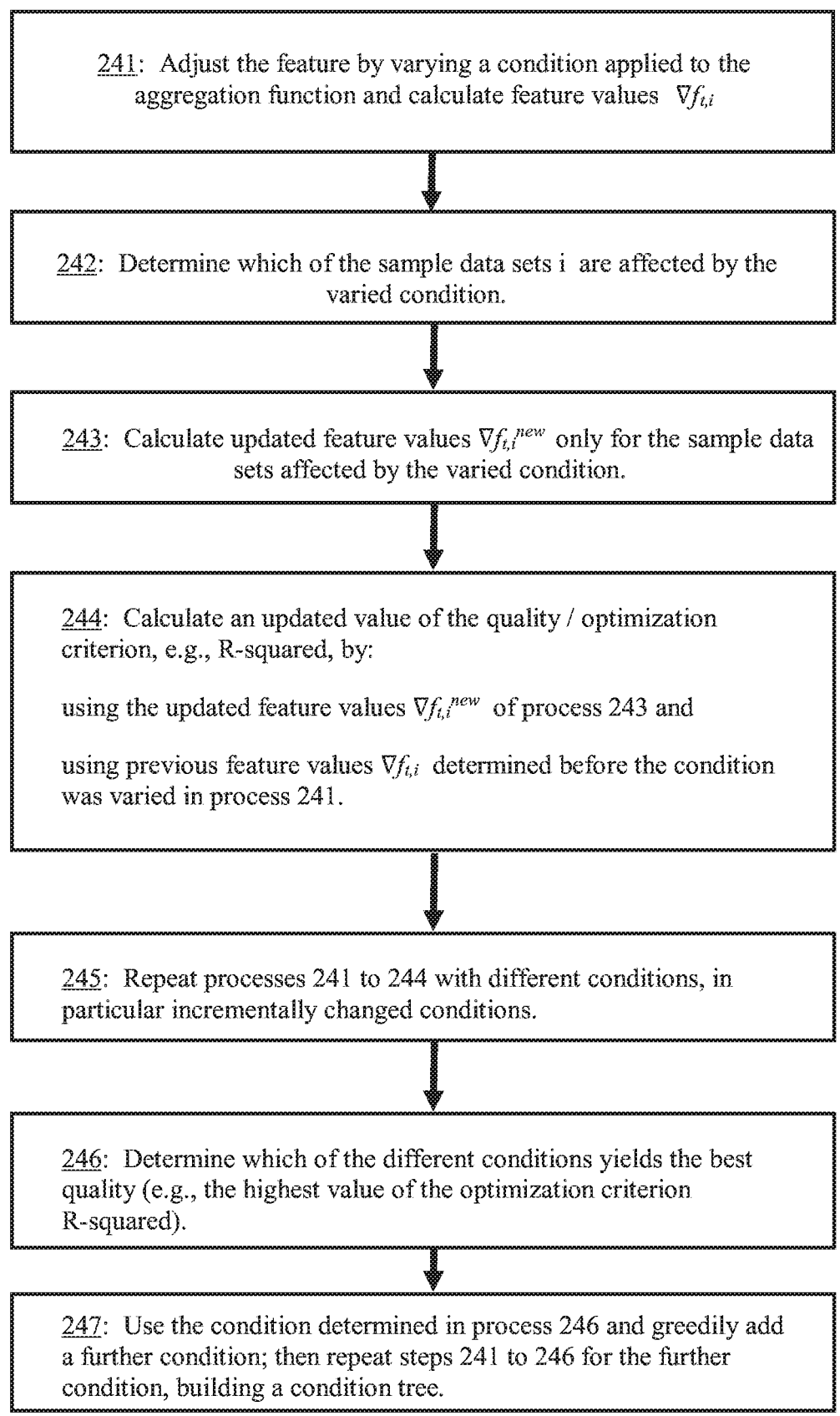

In process 241 of FIG. 23, the feature of FIG. 22 is adjusted by varying a condition applied to the aggregation function used to calculate the feature values $\nabla ft,i$. Exemplary conditions are indicated in other Figures with the WHERE command or the WHEN command. The condition may be such that only sample data that meets the condition (or alternatively sample data that does not meet the condition), will be aggregated with the aggregation function. The condition may refer to the sample data itself or to additional data associated with the sample data. The feature values $\nabla ft,i$ calculated in process 241 may vary from the previously calculated feature values (of e.g. FIG. 22) and may thus be referred to as $\nabla ft,i^{new}$.

Performing processes 232 and 235 of FIG. 23 again each time a new condition is tested would require much calculation power. This effort can be partly reduced if previous calculation results are used and modified to account for differences caused by the present condition. Process 242 determines which sample data sets i are affected by the varied condition. For example, the sample data may include a multitude of sample data sets i and only some of these sample data sets i include data for which the present condition changes whether or not the data shall be aggregated.

Process 243 calculates updated feature values $\nabla ft,i^{new}$ only for the sample data sets affected by the varied condition. In other words, previously calculated aggregation results that do not change due to the change in the condition of process 241 are not recalculated.

Process 244 then calculates the quality for the present case, i.e., for the presently applied condition. This calculation does not use the formula used in process 235 of FIG. 23 to initially calculate the quality. Instead, the quality is now calculated using the updated feature values $\nabla ft,i^{new}$ of process 243 and previous feature values $\nabla ft,i$ calculated before the presently applied condition was used. An example of such a calculation is described later in more detail.

Process 245 repeats the above processes 241 to 244 for different conditions. In particular, each time the processes 241 to 244 are repeated, the previously applied condition may be incrementally changed. For example, an increment may be a step x by which a numerical value y of a condition, such as a threshold, is each time changed. The value y may thus be changed to y+x, then to y+2x and so forth.

After a respective quality has been determined for a plurality of different conditions, process 246 determines with which condition the best quality was achieved. Depending on the quality or optimization criterion, the best quality may either be the highest or lowest value.

Process 247 uses the (first) condition determined in process 246 and adds a further (second) condition. The above-described processes are repeated for the further second condition to determine the best-possible quality and then use this second condition that yields the best quality. When the second condition is varied, the previously determined first condition stays fixed and is not changed. This may be described as greedily adding conditions. Sample data that the first condition classifies as not to be aggregated may be split by the second condition into two groups, one of which shall be aggregated and the other shall not be aggregated. This is also described as changing the activation status for this part of the sample data. Further different conditions may greedily be added to both the TRUE and FALSE outcomes of the first condition. In this way, a condition tree is formed. A feature that may now be output to be used in other applications may comprise one or more aggregation functions and this condition tree, i.e., a plurality of conditions together with the indication whether or not sample data shall be aggregated if the condition(s) are met or not met. In implementations in which not the sample data itself but weights assigned to the sample data is aggregated, a feature may comprise one or more aggregation functions, the conditions and the values of the weights. In a machine-learning application, the feature determined as described above is used to calculate feature values from the present sample data.

Figure 24:
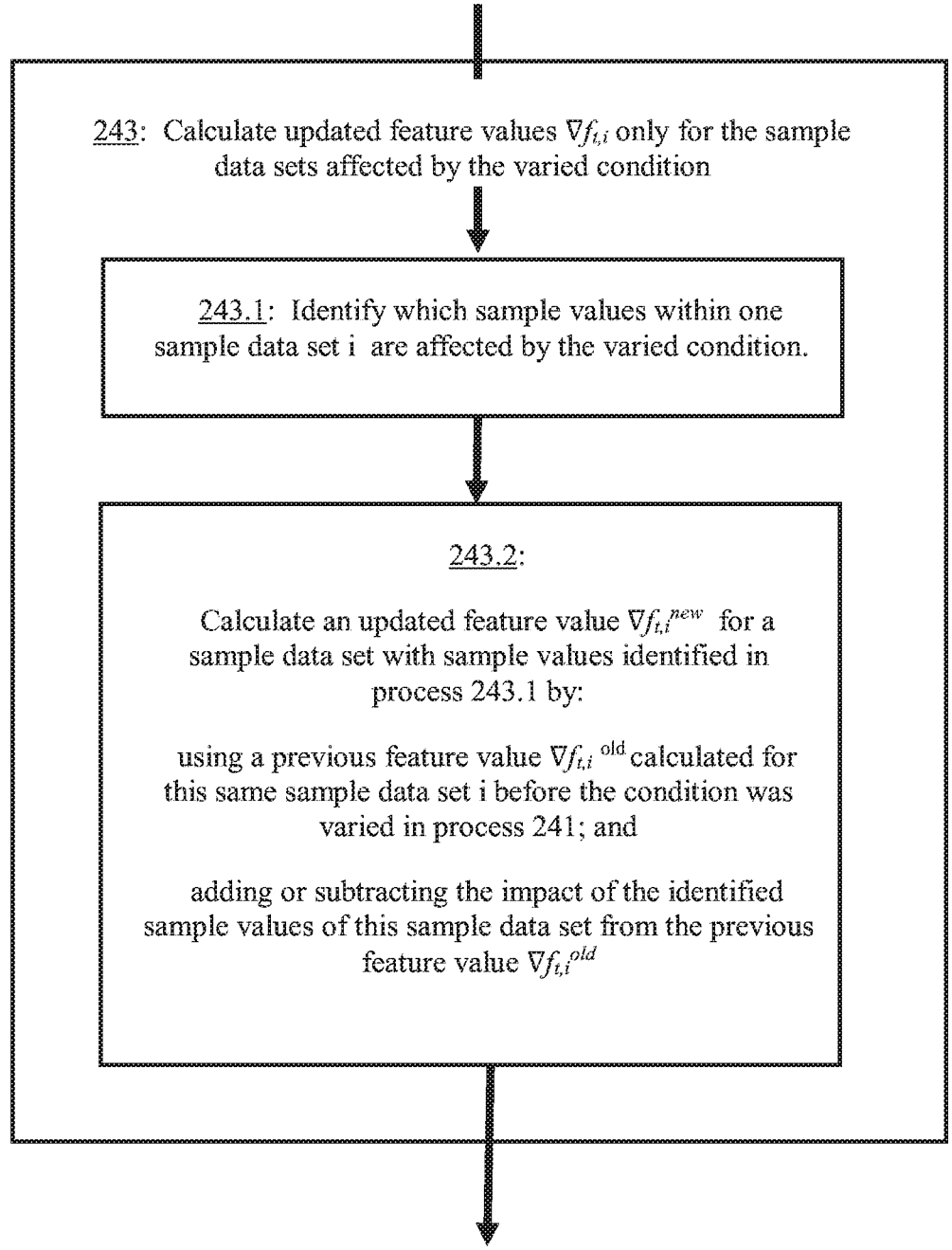

FIG. 24 shows an example of the process 243 of FIG. 23 in more detail. An incremental change of a condition may not change the aggregation results for all sample data sets i but just for some sample data sets. For these sample data sets the aggregation results needs to be updated when the condition is varied. However, it is not always necessary to redo the whole aggregation calculation (as done in process 232 of FIG. 22). Instead, process 243.1 may first identify which sample values within one sample data set are affected by the varied condition, e.g., which sample values M were previously aggregated but shall not be aggregated anymore according to the varied condition. Process 243.2 then calculates an updated feature value $\nabla ft,i^{new}$ by using the previously calculated feature value $\nabla ft,i^{old}$ for this sample data set and adjusting it to account for the contribution of the sample values M. In the case of a SUM function as an aggregation function, this adjustment can be easily done by adding or subtracting the values of the sample values M from the previously calculated feature value $\nabla fr,i^{old}$. In this way, calculating an updated feature value $\nabla ft,i^{new}$ may be significantly accelerated, in particular if one data set includes a large number of values, such as 10,000 values, and the incremental change in the condition only affects a few values, e.g., less than 10 values.

FIG: 25 illustrates an example of process 244 regarding the calculation of a quality value when a condition is varied. This example is based on R-squared as the optimization criterion function. Loss functions or other optimization criterion function may be used instead. The calculation of a quality according to the formula of R-squared shown in process 235 of FIG. 22 puts rather high demands on computation power. Hence, this calculation is not performed each time a condition is varied. Instead, the optimization criterion update formula shown in process 244 of FIG. 25 may be used. It uses previously calculated feature value $\nabla f_{t,i}^{old}$ and describes how a change in a specific feature value, e.g. for i=2: a change from $\nabla f_{t,2}^{old}$ to $\nabla f_{t,2}^{new}$ affects the resulting quality measure R-squared. The calculation shown in FIG. 25 of updating the R-squared value may be particularly advantageous if not all but rather a small part of all feature values $\nabla f_{t,i}$ are affected by a change in the condition. This is often the case when incremental changes are used. The procedure of FIG. 25 thus offers a way to efficiently determine qualities for a large number of different conditions that slightly vary from each other.

It is understood that the update rate calculation can be applied in any manner described herein.

Applications

Various approaches for analyzing statistical models and relational data models can be applied to the implementations described herein. For example, datasets can be refined by techniques such as gradient boosting, random forests, AdaBoost and neural networks. In various implementations, statistical predictive models can develop and adjust underlying algorithms, equations, connections, sub-models, etc., therein by processing multiple inputs to calculate outputs and compare outputs to predetermined or expected values.

Statistical predictive models can take the form of an artificial neural network (ANN), and more specifically can include one or more sub-classifications of ANN architectures, whether currently-known or later developed. In one example, statistical predictive models can take the form of a multilayer perceptron (MLP) neural network. MLP neural networks may be distinguished from other neural networks, e.g., by mapping sets of input data onto corresponding sets of outputs by way of a directed graph. MLP neural networks can rely upon automatic supervised learning, e.g., through one or more backpropagation processes described herein. MLP neural networks may be particularly suitable for sets of data which may not be linearly separable by conventional mathematical techniques.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, C++, C, Go, Rust, D or Scala or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method of generating a feature for an ensemble-learning application comprising a set of base learners, each forming a respective feature, to make a prediction, wherein the generation of a feature is based on given relational sample data, given target values and a given loss function, the method comprising:
   a) forming a preliminary feature through at least one aggregation function that aggregates relational sample data or learnable weights applied to the sample data;
   b) calculating aggregation results with the aggregation function;
   c) using the loss function to calculate pseudo-residuals based on at least the target values, and determining, based upon an optimization criterion formula, how strong the aggregation results relate to the pseudo-residuals calculated with the target values;
   d) adjusting the preliminary feature by incrementally changing a condition applied to the aggregation function, wherein the condition affects which sample values of the sample data are to be aggregated with the aggregation function;
   e) calculating aggregation results of the adjusted preliminary feature by adjusting the aggregation results of the preliminary feature before adjustment through at least: e1) determining which sample values of the sample data are affected by the changed condition, e2) adjusting the aggregation results of the preliminary feature before adjustment, to account for a contribution of the sample values affected by the changed condition;
   f) determining how strong the aggregation results of the adjusted preliminary feature relate to the pseudo-residuals calculated with the target values; and
   g) repeating processes (d) through (f) for a plurality of incremental changes, and selecting a feature for which the aggregation results relate strongest to the pseudo-residuals calculated with the target values.

2. The computer-implemented method of claim 1, wherein process (g) includes repeating processes (d) through (f) at least twenty times, and each time changing the applied condition such that the aggregation function aggregates a larger share of the sample data or each time a smaller share of the sample data.

3. The computer-implemented method of claim 1, wherein the condition splits the sample data into different groups associated with different learnable weights.

4. The computer-implemented method of claim 1, wherein process (e) comprises: incrementally adjusting the aggregation results from the previous preliminary feature.

5. The computer-implemented method of claim 1, further comprising: (h) outputting the adjusted feature for which the aggregation results relate strongest to the pseudo-residuals calculated with the target values for use in the ensemble learning application.

6. The computer-implemented method of claim 1, further comprising incrementally repeating processes (a) through (g) for a plurality of additional conditions, wherein the adjusted feature becomes the preliminary feature during the repeating.

7. The computer-implemented method of claim 6, wherein calculating the result of the changed aggregation function includes using only a difference between the result from a current aggregation function and the result from a previous aggregation function.

8. The computer-implemented method of claim 6, wherein outputting the adjusted feature is performed for only one of the adjusted features for which the aggregation results relate strongest to the pseudo-residuals.

9. The computer-implemented method of claim 1, wherein quality is defined by the optimization criterion formula.

10. The computer-implemented method of claim 1, wherein each feature is attributed to a single aggregation function.

11. The computer-implemented method of claim 1, further comprising:
performing processes (a) through (g) using a distinct preliminary feature;
calculating a pseudo-residual for the adjusted feature; and
training the distinct preliminary feature to predict an error from the adjusted feature.

12. The computer-implemented method of claim 1, further comprising:
identifying which part of the sample data is affected by the presently applied incremental change of the condition, with the help of a match change identification algorithm,
wherein process (e) of calculating the aggregation results of the adjusted preliminary feature comprises:
adjusting the aggregation result from the previous preliminary feature by calculating how the sample data identified by the match change identification algorithm changes the aggregation results from the previous preliminary feature.

13. The computer-implemented method of claim 1,
wherein the condition defines a threshold for additional data associated with the sample data, and only sample data for which the associated additional data is on a specific side of the threshold is to be aggregated with the aggregation function, or
wherein the condition defines a categorical value and only sample data to which the categorical value of the condition is attributed is to be aggregated with the aggregation function.

14. The computer-implemented method of claim 1, further comprising:
after selecting, in process (g) the feature for which the aggregation results relate strongest to the pseudo-residuals calculated with the target values:
(h) adding a further condition to the aggregation function and repeating processes (d) through (g) to determine the feature with the further condition for which the aggregation results relate strongest to the pseudo-residuals calculated with the target values; and
repeating process (h) to add still further conditions until a stop algorithm determines that no more conditions are to be applied to the aggregation function.

15. The computer-implemented method of claim 1, further comprising:
using an optimization criterion update formula that describes how a change in the aggregation result of the aggregation function changes a previously calculated outcome calculated with the optimization criterion formula,
wherein process (f) of determining how strong the aggregation results of the adjusted preliminary features relate to the pseudo-residuals calculated with the target values comprises: determining with the optimization criterion update formula how the change in the aggregation result affects how strong the aggregation results of the adjusted preliminary features relate to the pseudo-residuals calculated with the target values, without using the optimization criterion formula for calculating how strong the aggregation results of the adjusted preliminary features relate to the pseudo-residuals calculated with the target values.

16. The computer-implemented method of claim 1,
wherein the relational sample data comprises sample data sets in one or more peripheral tables,
wherein the target values are included in a population table,
wherein calculated aggregation results are inserted into the population table,
wherein the optimization criterion formula uses values from the population table but not from any peripheral table.

17. The computer-implemented method of claim 1, wherein the preliminary feature comprises at least a first and second aggregation functions;
the second aggregation function calculates an aggregation result from aggregation results of the first aggregation function; and
one or more conditions are applied to at least one of the aggregation functions and processes (d) to (g) are carried out with respect to the one or more conditions.

18. A computer-implemented machine-learning method comprising:
using one or more features determined and selected with the method of claim 1 to calculate aggregation results from sample data that is at least partially included in one or more peripheral tables;
joining the calculated aggregation results to a population table which includes target values; and
training a machine-learning algorithm based on the aggregation results and the target values in the population table.

19. A system comprising:
a computing device having a processor and a memory, the computing device configured to generate a feature for an ensemble learning application comprising a set of base learners, each forming a respective feature, to make a prediction, wherein the generation of a feature is based on given relational sample data, given target values and a given loss function, by performing processes including:
a) forming a preliminary feature through at least one aggregation function that aggregates relational sample data or learnable weights applied to the sample data;
b) calculating aggregation results with the aggregation function;
c) using the loss function to calculate pseudo-residuals based on at least the target values, and determining, based upon an optimization criterion formula, how strong the aggregation results relate to the pseudo-residuals calculated with the target values;
d) adjusting the preliminary feature by incrementally changing a condition applied to the aggregation function, wherein the condition affects which sample values of the sample data are to be aggregated with the aggregation function;
e) calculating aggregation results of the adjusted preliminary feature by adjusting the aggregation results of the preliminary feature before adjustment, through at least: e1) determining which sample values of the sample data are affected by the changed condition, e2) adjusting the aggregation results of the preliminary feature before adjustment, to account for a contribution of the sample values affected by the changed condition;
f) determining how strong the aggregation results of the adjusted preliminary feature relate to the pseudo-residuals calculated with the target values; and
g) repeating processes (d) through (f) for a plurality of incremental changes, and selecting a feature for which the aggregation results relate strongest to the pseudo-residuals calculated with the target values.

* * * * *